US011929015B2

(12) United States Patent
Kim et al.

(10) Patent No.: US 11,929,015 B2
(45) **Date of Patent: *Mar. 12, 2024**

(54) DISPLAY MODULE

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Jinho Kim, Suwon-si (KR); Yong-Sang Kim, Suwon-si (KR); Donggun Oh, Suwon-si (KR); Jongsu Oh, Suwon-si (KR); Tetsuya Shigeta, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,420

(22) Filed: Dec. 6, 2022

(65) Prior Publication Data

US 2023/0101460 A1 Mar. 30, 2023

Related U.S. Application Data

(63) Continuation of application No. 17/139,414, filed on Dec. 31, 2020, now Pat. No. 11,551,605.

(Continued)

(30) Foreign Application Priority Data

Sep. 22, 2020 (KR) ........................ 10-2020-0122527

(51) Int. Cl.

*G09G 3/32* (2016.01)
*G09G 3/20* (2006.01)

(52) U.S. Cl.

CPC ............. *G09G 3/32* (2013.01); *G09G 3/2014* (2013.01); *G09G 2300/0452* (2013.01);

(Continued)

(58) Field of Classification Search

CPC .......... G09G 3/2014; G09G 3/30; G09G 3/32; G09G 3/3225; G09G 3/325;

(Continued)

(56) References Cited

U.S. PATENT DOCUMENTS 7,167,169 B2 1/2007 Libsch et al.
7,609,234 B2 10/2009 Cho et al.

(Continued)

FOREIGN PATENT DOCUMENTS

EP 3 319 075 A1 5/2018
JP 2006-10742 A 1/2006

(Continued)

OTHER PUBLICATIONS

Communication dated Aug. 25, 2022, issued by the European Patent Office in European Application No. 20908485.4.

(Continued)

*Primary Examiner* — Jason M Mandeville
(74) *Attorney, Agent, or Firm* — Sughrue Mion, PLLC

(57) ABSTRACT

A display module includes a display panel in which a plurality of pixels each including a plurality of sub-pixels are disposed on a plurality of row lines; and a driver. The driver is configured to set a PWM data voltage to the plurality of sub-pixels included in the plurality of row lines in a row line sequence, apply a sweep signal, which is a voltage signal sweeping between two different voltages, to sub-pixels among the plurality of sub-pixels that are included in at least some consecutive row lines among the plurality of row lines in the row line sequence, and drive the display panel to cause the sub-pixels included in the at least (Continued)

some consecutive row lines to emit light based on the PWM data voltage in the row line sequence.

7 Claims, 44 Drawing Sheets

Related U.S. Application Data

(60) Provisional application No. 62/956,849, filed on Jan. 3, 2020.

(52) U.S. Cl.
CPC ............... *G09G 2300/0819* (2013.01); *G09G 2300/0861* (2013.01); *G09G 2310/0259* (2013.01); *G09G 2310/0272* (2013.01); *G09G 2310/0297* (2013.01); *G09G 2310/066* (2013.01); *G09G 2320/0223* (2013.01); *G09G 2320/0242* (2013.01); *G09G 2320/064* (2013.01)

(58) Field of Classification Search
CPC ... G09G 2300/0452; G09G 2300/0819; G09G 2300/0861; G09G 2310/0259; G09G 2310/0267; G09G 2310/0272; G09G 2310/0286; G09G 2310/0297; G09G 2310/062; G09G 2310/066; G09G 2320/0223; G09G 2320/0242; G09G 2320/064
USPC .................................................... 345/76, 204
See application file for complete search history.

(56) References Cited

U.S. PATENT DOCUMENTS

| | | | |
|---|---|---|---|
| 7,808,497 | B2 | 10/2010 | Lo et al. |
| 9,569,046 | B2 | 2/2017 | Kim et al. |
| 9,589,530 | B1 | 3/2017 | Novoselov et al. |
| 10,593,251 | B2 | 3/2020 | Shigeta et al. |
| 10,706,766 | B2 | 7/2020 | Kim et al. |
| 11,056,047 | B2 | 7/2021 | Shigeta et al. |
| 2004/0207614 | A1 | 10/2004 | Yamashita et al. |
| 2005/0280612 | A1 | 12/2005 | Yamamoto et al. |
| 2006/0170636 | A1 | 8/2006 | Nakamura et al. |
| 2009/0167649 | A1 | 7/2009 | Ishizuka |
| 2011/0084993 | A1 | 4/2011 | Kawabe |
| 2014/0152709 | A1 | 6/2014 | Kawae et al. |
| 2015/0103035 | A1 | 4/2015 | Kim et al. |
| 2017/0047042 | A1 | 2/2017 | Hu et al. |
| 2017/0115817 | A1 | 4/2017 | Kim et al. |
| 2017/0263183 | A1 | 9/2017 | Lin et al. |
| 2018/0182279 | A1 | 6/2018 | Sakariya et al. |
| 2018/0301080 | A1 | 10/2018 | Shigeta et al. |
| 2019/0371231 | A1 | 12/2019 | Kim et al. |
| 2019/0371232 | A1 | 12/2019 | Kim et al. |

FOREIGN PATENT DOCUMENTS

| | | | |
|---|---|---|---|
| JP | 5352101 | B2 | 11/2013 |
| JP | 6312083 | B2 | 4/2018 |
| KR | 10-0599497 | B1 | 7/2006 |
| KR | 10-150823 | B1 | 3/2015 |
| KR | 10-2015-0042625 | A | 4/2015 |
| KR | 10-2018-0115615 | A | 10/2018 |
| KR | 10-2019-0076984 | A | 7/2019 |
| WO | 2009/117090 | A1 | 9/2009 |

OTHER PUBLICATIONS

Communication dated Nov. 29, 2022 issued by the European Patent Office in European Patent Application No. 20908485.4.

International Search Report (PCT/ISA/210) dated Apr. 7, 2021 by the International Searching Authority in International Application No. PCT/KR2020/019500.

Written Opinion (PCT/ISA/237) dated Apr. 7, 2021 by the International Searching Authority in International Application No. PCT/KR2020/019500.

BLUE

DISPLAY MODULE

CROSS-REFERENCE TO RELATED APPLICATION(S)

This application is a Continuation of U.S. application Ser. No. 17/139,414, filed on Dec. 31, 2020, which is based on and claims benefit of U.S. Provisional Patent Application No. 62/956,849, filed on Jan. 3, 2020, and is also based on and claims priority under 35 U.S.C. § 119 to Korean Patent Application No. 10-2020-0122527, filed on Sep. 22, 2020, in the Korean Intellectual Property Office, the disclosures of which are incorporated by reference herein in their entireties.

BACKGROUND

1. Field

The disclosure relates to a display module. More particularly, the disclosure relates to a display module in which self-emitting device forms a sub-pixel.

2. Description of Related Art

In a related art display panel where an inorganic light emitting element such as a red light emitting diode (LED), a green LED, and a blue LED (hereinafter, LED refers to an inorganic light emitting element) is driven with a sub-pixel, a gray scale of a sub-pixel is represented by a pulse amplitude modulation (PAM) driving method.

In this case, depending on a magnitude of a driving current, the wavelength as well as a gray scale of emitted light may change, resulting in decrease in color reproducibility of an image. FIGS. 1A, 1B, and 1C illustrate a wavelength change according to the magnitude of a driving current flowing through a blue LED, a green LED, and a red LED.

SUMMARY

Additional aspects will be set forth in part in the description which follows and, in part, will be apparent from the description, or may be learned by practice of the presented embodiments of the disclosure.

Embodiments of the disclosure provide a display module which includes a display panel in which a plurality of pixels each including a plurality of sub-pixels are disposed on a plurality of row lines and a driver configured to set a pulse width modulation (PWM) data voltage to sub-pixels included in the plurality of row lines in a row line sequence, and apply a sweep signal, which is a voltage signal sweeping between two different voltages, to sub-pixels included in at least some consecutive row lines among the plurality of row lines in a row line sequence and drive the display panel to cause sub-pixels included in the at least some consecutive row lines to emit light based on the set PWM data voltage in a row line sequence.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

An objective of the disclosure is to provide a display module which provides improved color reproducibility for an input image signal and a driving method thereof.

Another objective of the disclosure is to provide a display module including a sub-pixel circuit and a driving circuit capable of efficiently and stably driving an inorganic light emitting element constituting a sub-pixel, and a driving method thereof.

In describing the disclosure, detailed descriptions of related art techniques are omitted when it is determined that the disclosure may unnecessarily obscure the gist of the disclosure. In addition, the description of the same configuration of the disclosure will be omitted.

The suffix "part" for a component used in the description of the disclosure is added or used in consideration of the convenience of the specification, and it is not intended to have a meaning or role that is distinct from each other.

The terminology used in this disclosure is used to describe an embodiment, and is not intended to restrict and/or limit the disclosure. A singular expression includes plural expressions unless the context clearly indicates otherwise.

In the disclosure, the term "has," "may have," "includes" or "may include" indicates existence of a corresponding feature (e.g., a numerical value, a function, an operation, or a constituent element such as a component), but does not exclude existence of an additional feature.

In the disclosure, the terms "first, second, etc." may be used to describe various elements regardless of their order and/or importance and to discriminate one element from other elements, but are not limited to the corresponding elements.

If it is described that an element (e.g., first element) is "operatively or communicatively coupled with/to" or is "connected to" another element (e.g., second element), it may be understood that the element may be connected to the other element directly or through still another element (e.g., third element).

When it is mentioned that one element (e.g., first element) is "directly coupled" with or "directly connected to" another element (e.g., second element), it may be understood that there is no element (e.g., third element) present between the element and the other element.

The terms used in embodiments of the disclosure may be interpreted in a meaning commonly known to those of ordinary skill in the art unless otherwise defined.

Various embodiments of the disclosure will be described in detail with reference to the accompanying drawings.

Figure 1A:
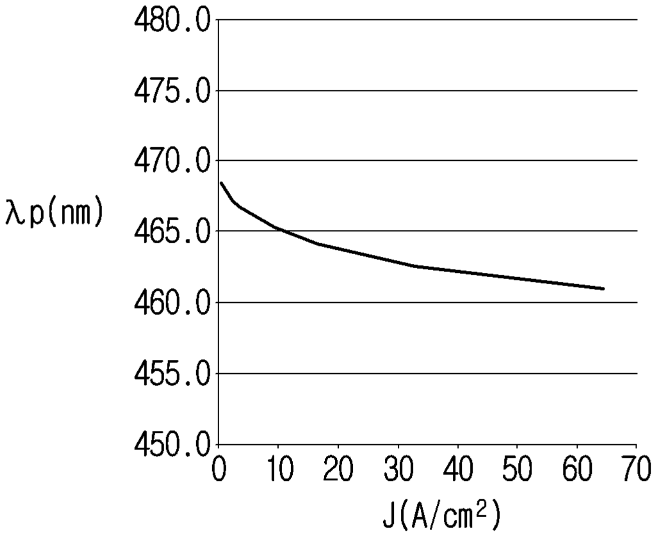
FIGS. 1A, 1B, and 1C are graphs illustrating a change in wavelength according to the size of a driving current flowing through a blue light emitting diode (LED), a green LED, and a red LED.
Figure 1B:
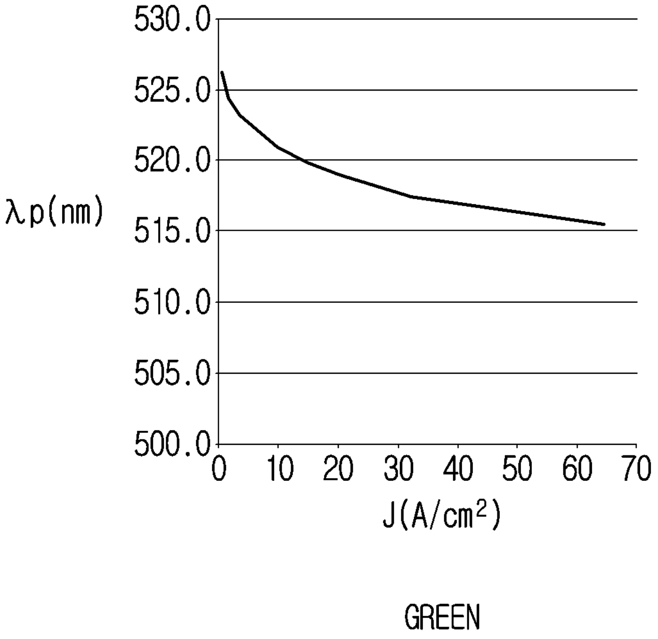
Figure 1C:
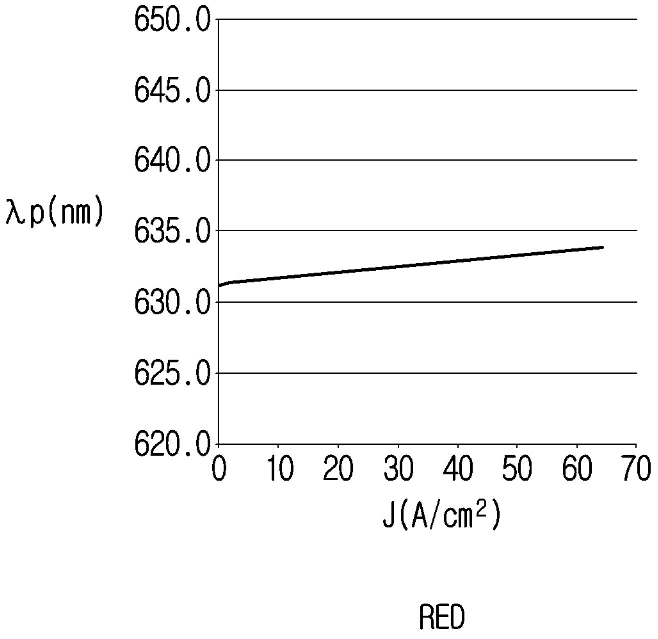
Figure 2:
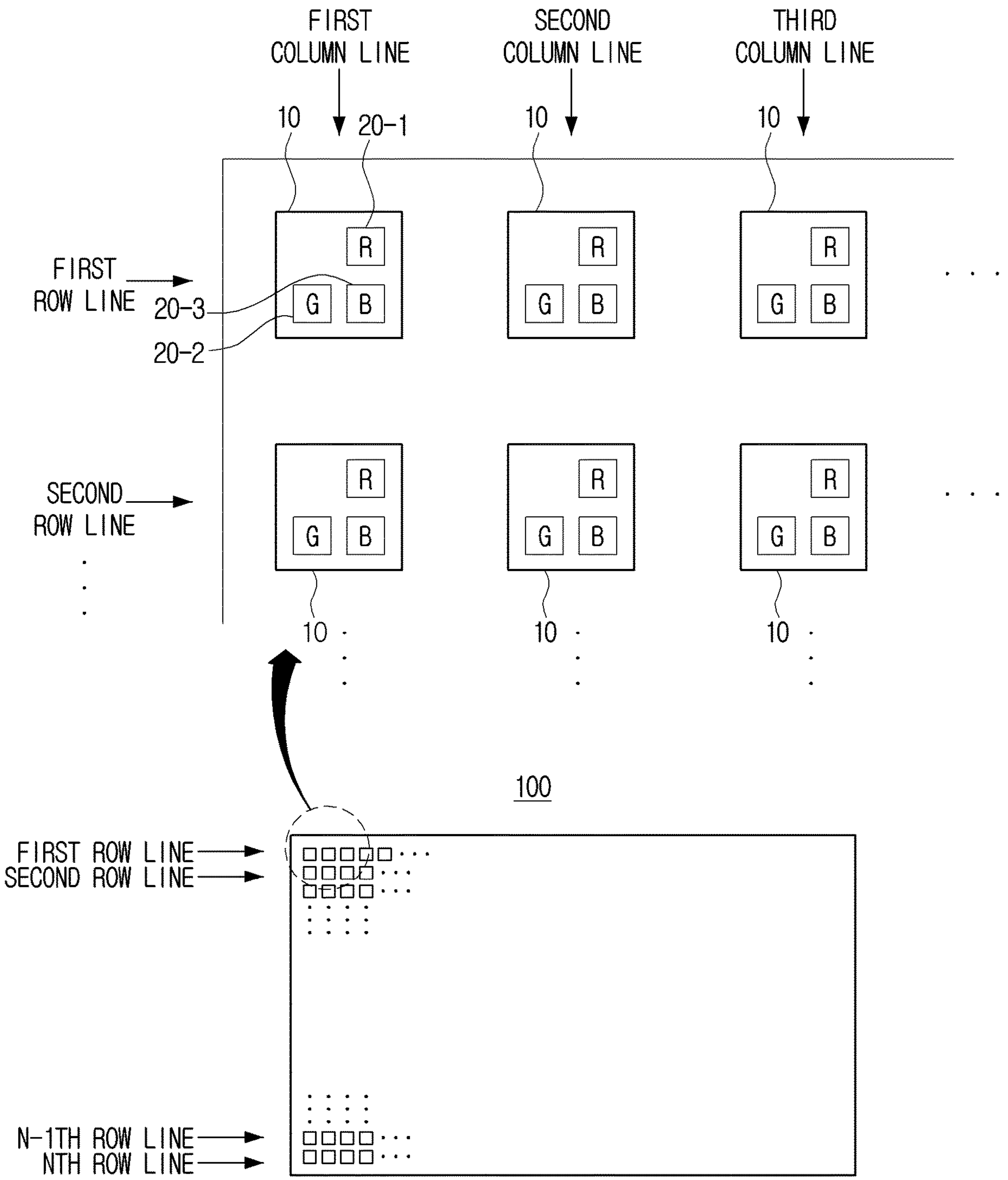
FIG. 2 illustrates a pixel structure of a display module according to an embodiment.

FIG. 2 illustrates a pixel structure of a display module according to an embodiment.

Referring to FIG. 2, a display panel 100 includes a plurality of pixels 10 disposed or arranged in a matrix form. The matrix form may include a plurality of row lines or a plurality of column lines.

The row line may also be called a horizontal line, a scan line, or a gate line, and the column line may also be called a vertical line or a data line.

Each pixel 10 included in the display panel 100 may include three types of sub-pixels including a red (R) sub-pixel 20-1, a green (G) sub-pixel 20-2, and a blue (B) sub-pixel 20-3.

Each sub-pixel 20-1 to 20-3 may include an inorganic light emitting element corresponding to a type of sub-pixel and a sub-pixel circuit to control light emission time of the inorganic light emitting element.

The R sub-pixel 20-1 may include a R-inorganic light-emitting element and a sub-pixel circuit for controlling the light emission time of the R-inorganic light-emitting element, a G sub-pixel 20-2 may include a G-inorganic light-emitting element and a sub-pixel circuit for controlling the light emission time of the G-inorganic light-emitting element, and a B sub-pixel 20-3 may include a B-inorganic light-emitting element and a sub-pixel circuit for controlling the light emission time of the B-inorganic light-emitting element, respectively.

Each sub-pixel circuit may represent a gray scale of each sub-pixel by controlling light emission time of the corresponding inorganic light emitting element based on the applied pulse width modulation (PWM) data voltage.

The sub-pixels included in each row line of the display panel 100 may be driven in order of "PWM data voltage setting (or programming)" and "light emitting based on the set PWM data voltage". In this regard, according to an embodiment, the sub-pixels included in each row line of the display panel 100 may be driven in the order of row lines.

The PWM data voltage setting and light emitting operation of sub-pixels included in one row line (e.g., the first row line) and the PWM data voltage setting and light emitting operation of sub-pixels included in a next row line (e.g., the second row line) may be sequentially performed in the order of row lines.

Being sequentially performing does not mean that an operation associated with the next row line should begin after all operations associated with one row line have been completed. In the above example, the PWM data voltage may be set to the sub-pixels included in the second row line after the PWM data voltage is set to the sub-pixels included in the first row line, and it is not necessary that the PWM data voltage is to be set to the sub-pixels included in the second row line after the light emission operation of the sub-pixels included in the first row line is completed.

Figure 3A:
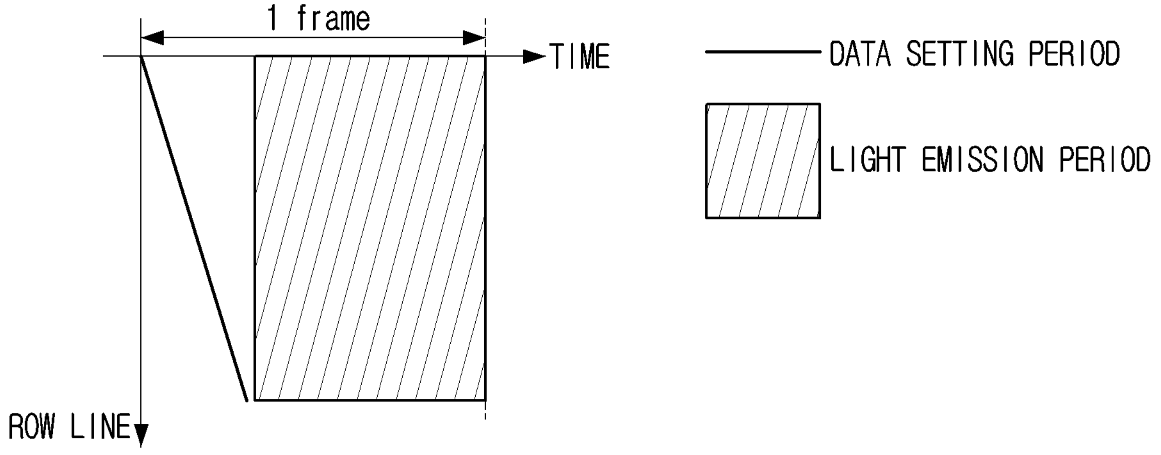
FIG. 3A (RELATED ART)
FIG. 3A is a conceptual diagram illustrating a driving method of a related art display panel.
Figure 3B:
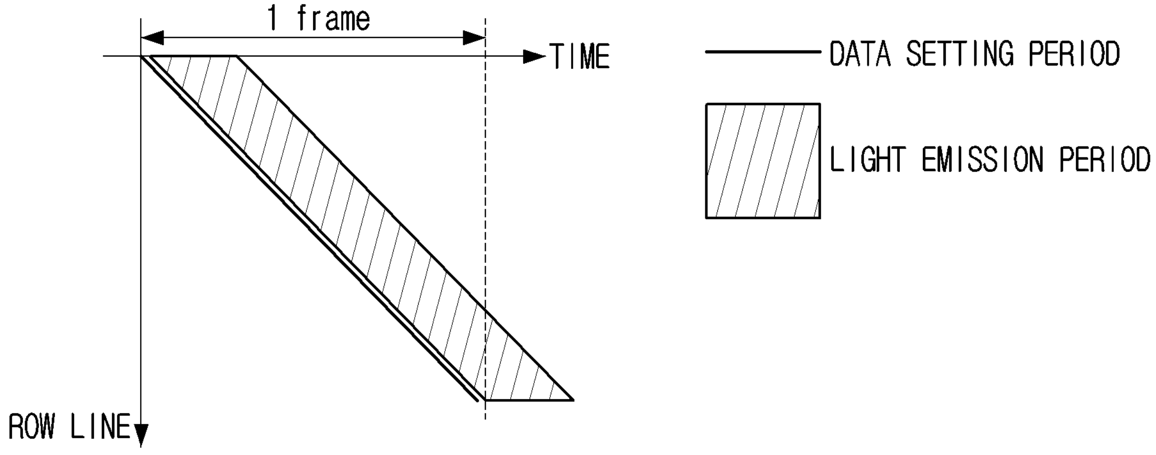
FIG. 3B is a conceptual diagram illustrating a driving method of a display panel according to an embodiment.
Figure 3C:
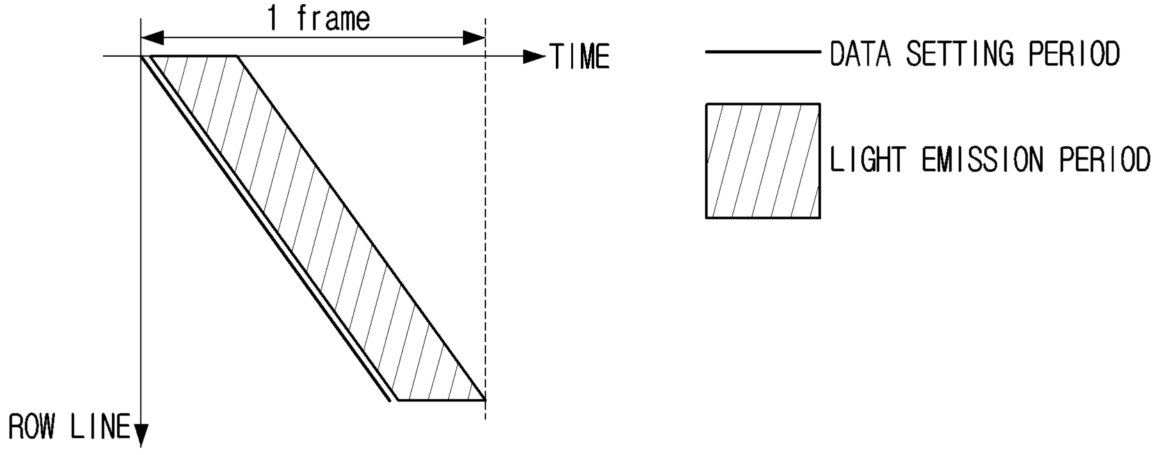
FIG. 3C is a conceptual diagram illustrating a driving method of a display panel according to an embodiment.
Figure 3D:
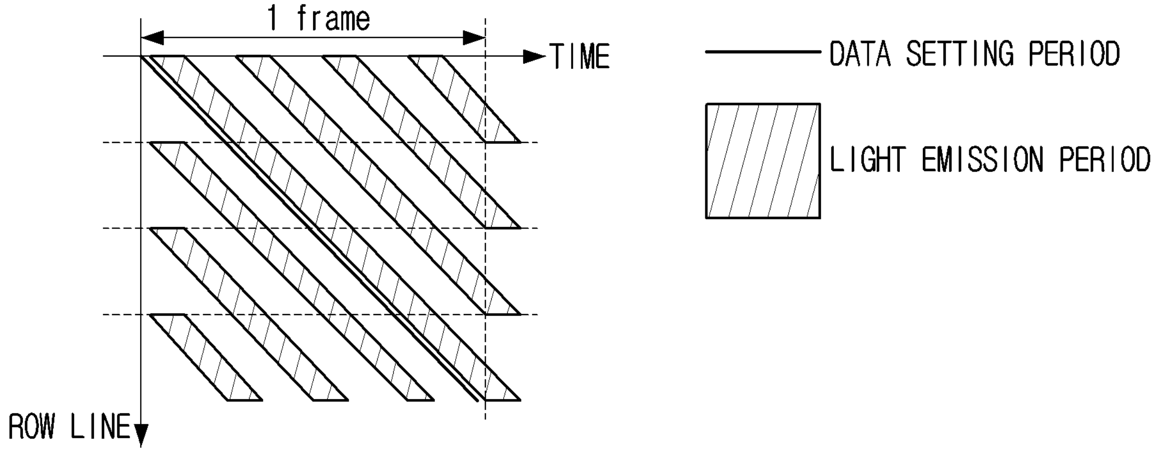
FIG. 3D is a conceptual diagram illustrating a driving method of a display panel according to an embodiment.

FIG. 3A is a conceptual diagram illustrating a driving method of a related art display panel; FIGS. 3B to 3D are conceptual diagrams illustrating a driving method of a display panel according to an embodiment.

FIGS. 3A to 3D illustrate various ways to drive a display panel during one image frame time. Referring to FIGS. 3A to 3D, a vertical axis represents a row line and a horizontal axis represents time. The data setting period represents the driving period of the display panel 100 which is set by applying the PWM data voltage to the sub-pixels included in each row line, and the light emitting period represents the driving period of the display panel 100 in which the sub-pixels emit light during a time corresponding to the PWM data voltage within the period.

Referring to FIG. 3A, in the related art, after PWM data voltage setting is completed for the entire row line of the display panel in the order of row lines, a light emitting period is collectively proceeds.

In this example, the entire row lines of the display panel emit light simultaneously during the light emitting period, requiring high peak current, and thus, there is a problem in that peak power consumption required for a product is increased. When peak power consumption increases, a capacity of a power supply device such as a switched mode power supply (SMPS) installed in a product increases, resulting in an increase in cost and a volume, which causes design restriction.

In contrast, according to an embodiment of FIGS. 3B to 3D, there is only a difference in whether the PWM data voltage setting is completed for the entire row line during one image frame time (FIG. 3B), or whether light emitting periods for all row lines during one image frame time completely proceeds (in FIG. 3C), or whether a plurality of light emitting periods for each row line is exist during one image frame time (FIG. 3D), and the PWM data voltage setting period and the light emitting period of each row line are sequentially performed in a row line sequence.

As described above, when the light emitting period for each row line is sequentially driven in a row line sequence according to various embodiments, the number of row lines that simultaneously emit light may be reduced, and thus the amount of the peak current required may be reduced in comparison with the related art, and accordingly, peak power consumption may be reduced.

According to various embodiments, a phenomenon in which the wavelength of light emitted from the inorganic light emitting element is changed according to the gray scale may be prevented by PWM driving the inorganic light emitting element in an active matrix (AM) method. By driving the display panel 100 so that sub-pixels sequentially emit light in a row line sequence, instantaneous peak power consumption may be reduced.

Referring to FIG. 2, the sub-pixels 20-1 to 20-3 are arranged in an L-shape in which left and right of the sub-pixels 20-1 to 20-3 are changed in one-pixel region. However, an embodiment is not limited thereto, and the R, G, and B sub-pixels 20-1 to 20-3 may be arranged in a line in a pixel region, and may be arranged in various shapes according to an embodiment.

Referring to FIG. 2, a three-type sub-pixel may form one pixel as an example. However, according to an embodiment, four kinds of sub-pixels such as R, G, B, and white (W) may form one pixel, and any other number of sub-pixels may form one pixel.

Figure 4:
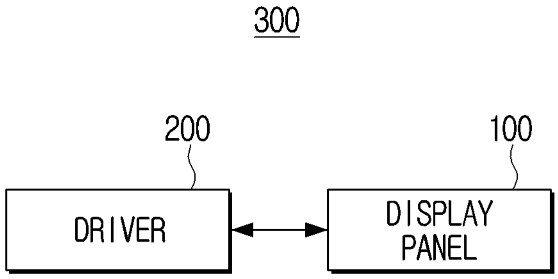
FIG. 4 is a block diagram illustrating a display module according to an embodiment.

FIG. 4 is a block diagram illustrating a display module according to an embodiment. Referring to FIG. 4, a display module 300 includes the display panel 100 and the driver 200.

The driver 200 drives the display panel 100. The driver 200 may provide various control signals, data signals, driving voltages, or the like, to the display panel 100 to drive the display panel 100.

The driver 200 may include at least one gate driver circuit for providing a control signal to drive the panels of the display panel 100 in a row line unit.

The driver 200 may include a source driver circuit (or data driver circuit) for providing PWM data voltage to each pixel (or sub-pixel) of the display panel 100.

The driver 200 may include a multiplexer (MUX) circuit for selecting each of the plurality of sub-pixels 20-1 to 20-3 included in one pixel 10.

The driver 200 may include a driving voltage providing circuit for providing a driving voltage (e.g., a first driving voltage, a second driving voltage, a ground voltage, a test voltage, a Vset voltage, etc. to be described below), and a constant current generator voltage, or the like, to each sub-pixel circuit included in the display panel 100.

The driver 200 may include a clock signal providing circuit for providing various clock signals to a gate driver or a data driver circuit, and may include a sweep signal providing circuit for providing a sweep signal (or sweep voltage) to be described below to a sub-pixel circuit.

At least some of the various circuits of the driver 200 described above may be implemented with a separate chip form to be mounted on an external printed circuit board (PCB) together with a timing controller (TCON), and may be connected to sub-pixel circuits formed on a thin film transistor (TFT) layer of the display panel 100 through the film on glass (FOG) wiring.

At least some of the various circuits of the driver 200 described above may be implemented in a separate chip form and arranged on a chip on film (COF) form on a film, and may be connected to sub-pixel circuits formed on the TFT layer formed on the display panel 100 through the FOG wiring.

At least some of the various circuits of the driver 200 described above may be implemented with a separate chip form to be arranged on a COG form (that is, arranged on a rear surface (an opposite side of a surface on which the TFT layer is formed with respect to the glass substrate) of the glass substrate (described below) of the display panel 100), and may be connected to the sub-pixel circuits formed on the TFT layer of the display panel 100 through the connection wiring.

At least some of the various circuits of the driver 200 described above may be formed in the TFT layer together with the sub-pixel circuits formed in the TFT layer in the display panel 100 and may be connected to the sub-pixel circuits.

For example, among various circuits of the driver 200 described above, the gate driver circuit, the sweep signal providing circuit, and the MUX circuit may be formed in the TFT layer of the display panel 100, the data driver circuit may be arranged on the rear surface of the glass substrate of the display panel 100, and the driving voltage providing circuit, the clock signal providing circuit, and the TCON may be arranged on the external PCB, but is not limited thereto.

In particular, according to an embodiment, the driver 200 may set the PWM data voltage to sub-pixels included in each row line of the display panel 100 in the order of row lines, apply a sweep signal to sub-pixels included in at least some consecutive row lines among the plurality of row lines in the order of row lines, and drive the display panel 100 so that the sub-pixels included in the at least some consecutive row lines emit light based on the set PWM data voltage.

At least some consecutive row lines may refer to all row lines of the display panel 100 or, consecutive row lines belonging to each group when dividing the entire row lines of the display panel 100 into a plurality of groups each including some consecutive row lines.

Accordingly, as shown in FIGS. 3B and 3C, the driver 200 may drive the display panel 100 so that sub-pixels included in the entire row lines of the display panel 100 may emit light in a row line sequence.

As illustrated in FIG. 3D, the driver 200 may drive the display panel 100 so that sub-pixels included in the row lines belonging to each group emit light in a row line sequence for each group including consecutive row lines.

Figure 5:
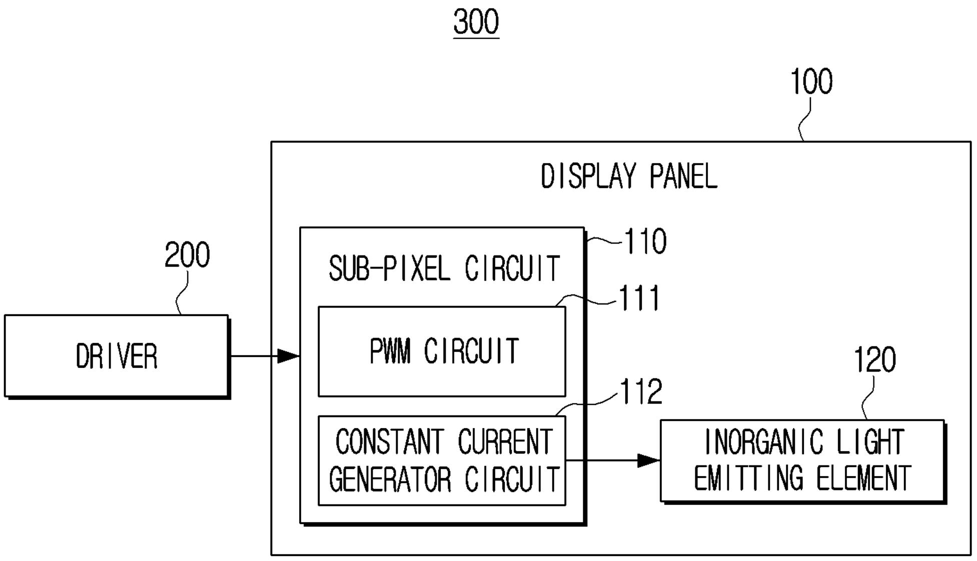
FIG. 5 is a detailed block diagram illustrating a display module 300 according to an embodiment.

FIG. 5 is a detailed block diagram illustrating a display module 300 according to an embodiment. In describing FIG. 5, description overlapped with FIG. 4 will be omitted.

Referring to FIG. 5, the display module 300 includes the display panel 100 including the sub-pixel circuit 110 and the inorganic light emitting element 120, and the driver 200.

The display panel 100 may have a structure in which a sub-pixel circuit 110 is formed on the glass, and the inorganic light emitting element 120 is arranged on the sub-pixel circuit 110. Referring to FIG. 10, only one sub-pixel-related structure included in the display panel 100 is illustrated for convenience, but the sub-pixel circuit 110 and the inorganic light emitting element 120 are provided for each sub-pixel of the display panel 100 described above.

The inorganic light emitting element 120 may be mounted on the sub-pixel circuit 110 so as to be electrically connected to the sub-pixel circuit 110, and may emit light based on the driving current provided from the sub-pixel circuit 110.

The inorganic light emitting element 120 may form sub-pixels 20-1 to 20-3 of the display panel 100, and there may be a plurality of types depending on the color of the emitted light. For example, the inorganic light emitting element 120 may include an R inorganic light emitting element emitting red color light, a G inorganic light emitting element emitting a green color light, and a B inorganic light emitting element emitting blue light.

The types of sub-pixels described above may be determined according to the type of the inorganic light emitting element 120. The R inorganic light emitting element may form the R sub-pixels 20-1, G inorganic light emitting element may form the G sub-pixel 20-2, and the B inorganic light emitting element may form the B sub-pixel 20-3.

The inorganic light emitting element 120 may refer to a light emitting element that is manufactured using an inorganic material which is different from organic light emitting diode (OLED) manufactured using an organic material.

According to an embodiment, the inorganic light emitting element 120 may be a micro light emitting diode (micro LED or μLED) having a size that is less than or equal to 100 micrometers (μm).

The display panel in which each sub-pixel is implemented with the micro LED is called a micro LED display panel. The micro LED display panel is one of a flat display panel and may include a plurality of inorganic light emitting diodes, each of which is less than or equal to 100 micrometers. The micro LED display panel may provide better contrast, response time, and energy efficiency compared to a liquid crystal display (LCD) panel requiring backlight. The organic light emitting diode (OLED) and the micro LED have good energy efficiency, but the micro LED may provide better performance than the OLED in terms of brightness, light emission efficiency, and operating life.

The inorganic light emitting element 120 may represent a grayscale value of different brightness depending on the magnitude of the driving current provided from the sub-pixel circuit 110 or the pulse width of the driving current. The pulse width of the driving current may be called a duty ratio of the driving current or the duration of the driving current.

For example, the inorganic light emitting element 120 may express a brighter gray scale value as the magnitude of the driving current is increased. The inorganic light emitting element 120 may express a brighter gray scale as the pulse width of the driving current increases (i.e., the duty ratio of the driving current increases or the duration of the driving current increases).

The sub-pixel circuit 110 may provide a driving current to the inorganic light emitting element 120. The sub-pixel circuit 110 may provide a driving current with controlled magnitude and duration to the inorganic light emitting element 120 based on a data voltage (e.g., a constant current generator voltage, a PWM data voltage), a driving voltage (e.g., a first driving voltage, a second driving voltage), and various control signals applied from the driver 200.

The sub-pixel circuit 110 may drive the inorganic light emitting element 120 by PAM and/or PWM driving, to control brightness of light emitted by the inorganic light emitting element 120.

The sub-pixel circuit 110 may include a constant current generator circuit 112 for providing a constant current of magnitude corresponding to the applied constant current generator voltage to the inorganic light emitting element 120, and the PWM circuit 111 for providing the constant current to the inorganic light emitting element 120 for a time corresponding to the set PWM data voltage. The constant current provided to the inorganic light emitting element 120 becomes the driving current described above.

According to an embodiment, the driver 200 may apply the same constant current generator voltage to all the constant current generator circuits 112 of the display panel 100. Therefore, since a driving current of the same magnitude (i.e., constant current) is provided to each inorganic light emitting element 120 through each constant current generator circuit 112, the wavelength change problem of the LED according to the magnitude change of the driving current may be solved.

The driver 200 may apply the PWM data voltage corresponding to a gray scale value of each sub-pixel to each of the PWM circuit 111 of the display panel 100. Accordingly, the duration of the driving current (i.e., the duration of the constant current) provided to the inorganic light emitting element 120 of each sub-pixel may be controlled through the PWM circuit 111. Accordingly, a gray scale of an image may be expressed.

The same constant current generator voltage may be applied to one display module 300, but a different constant current generator voltage may be applied to the other display module 300. When a plurality of display modules are connected to each other to form one large display device, a brightness deviation or a color deviation between the display modules may be compensated through voltage adjustment of the constant current generator.

The display module 300 according to various embodiments may be applied to various electronic products or electric products requiring a wearable device, a portable device, a handheld device, and a display in a single unit.

The display module 300 according to various embodiments may also be applied to a small display device such as a monitor for a personal computer, a television (TV), or a large display device such as a digital signage, an electronic display, or the like.

With reference to FIGS. 6A to 6F, a driving method of the display panel 100 as illustrated in FIG. 3D will be described in detail.

Figure 6A:
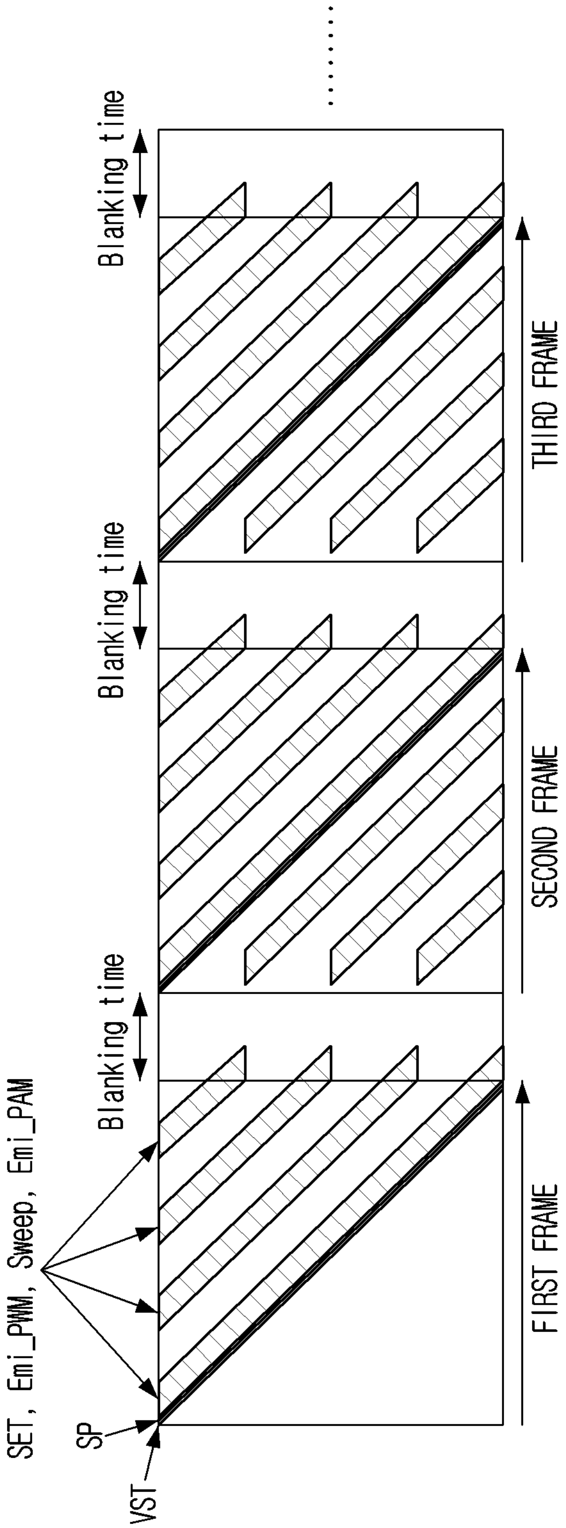
FIG. 6A illustrates a driving method of a display panel for a plurality of image frames according to an embodiment.

FIG. 6A illustrates a driving method of the display panel 100 a plurality of image frames according to an embodiment. In each frame of FIG. 6A, the vertical axis may represent a row line and the horizontal axis may represent time. The blanking time may refer to a time interval between frames where valid image data is not applied.

The VST and SP may refer to a control signal of the driver 200 applied to the sub-pixels included in each row line for the data setting operation, SET, Emi_PWM, sweep, and Emi_PAM may refer to a control signal of the driver 200 applied to the sub-pixels included in each row line for the light emitting operation.

Referring to FIG. 6A, for each row line during one image frame duration, the data setting period (i.e., the time period in which the control signal VST and SP is applied) is performed once, and the light emitting period (i.e., the time period in which SET, Emi_PWM, Sweep, Emi_PAM is applied) is performed multiple times.

According to an embodiment, during a data setting period for each row line, the driver 200 may set a PWM data voltage to the sub-pixels included in each row line, and during a plurality of light emitting periods for each row line, the driver 200 may drive the display panel 100 so that sub-pixels included in each row line to emit light for a time corresponding to the set PWM data voltage.

Figure 6B:
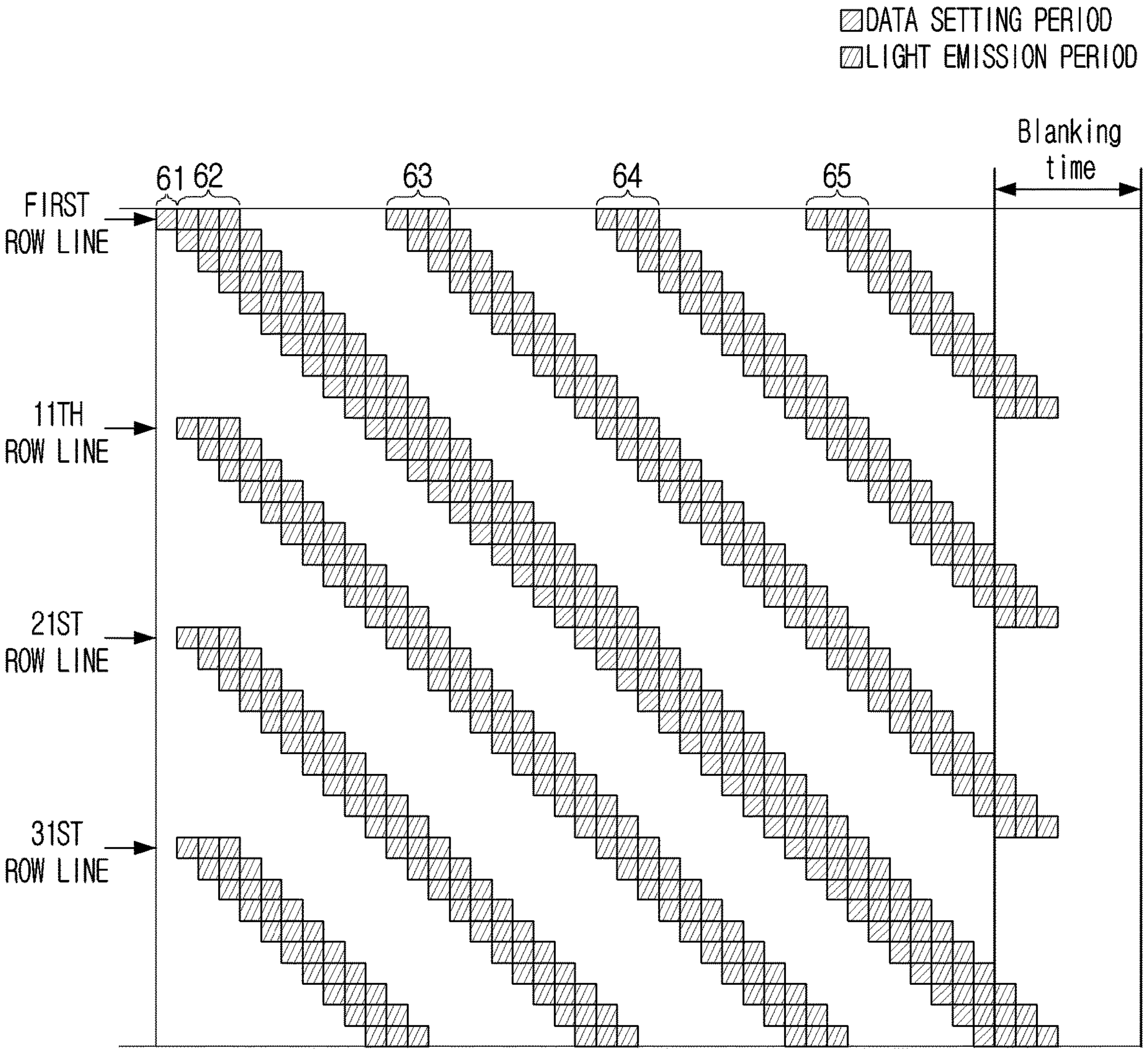
FIG. 6B illustrates a second frame shown in FIG. 6A in more detail.

FIG. 6B illustrates a second frame shown in FIG. 6A in more detail. In FIG. 6B, the vertical axis may refer to a row line and the horizontal axis may refer to time. In FIG. 6B, for example, the display panel 100 is formed of 40 row lines for convenience.

Referring to FIG. 6B, the driver 200 may apply a control signal (VST, SP) to the sub-pixels included in the first row line during a data setting period 61 for the first row line. Accordingly, the sub-pixels included in the first row line may be set with (or programmed) the PWM data voltages provided from the data driver.

The driver 200 may apply a control signal (e.g., SET, Emi_PWM, Sweep, Emi_PAM) to the sub-pixels included in the first row line during the first light emitting period 62 for the first row line. Accordingly, the sub-pixels included in the first row line may emit light for a time corresponding to the PWM data voltage in the first light emitting period 62.

The driver 200 may apply a control signal (e.g., SET, Emi_PWM, Sweep, Emi_PAM) to the sub-pixels included in the first row line, even during the second light emitting period 63 for the first row line in the same manner as the first light emitting period 62. The sub-pixels included in the first row line may emit light for a time corresponding to the PWM data voltage even in the second light emitting period 63.

This is the same for the third light emitting period 64 and the fourth light emitting period 65 for the first row line.

Referring to FIG. 6B, the driver 200 may sequentially perform the above-described operation on the first row line in the same manner for the sub-pixels included in the remaining row lines (second row line to the 40th row line) in a row line sequence.

Referring to FIG. 6B, because only one frame period (i.e., a second frame period) is illustrated, it is illustrated like that only three light emitting periods are progressed for the eleventh row line to the 20th row line, and only two light emitting periods are progressed for the 21st row line to the 30th row line, and only one light emitting period is performed for the 31st row line to the 40th row line. However, referring to the second frame period and the third frame period shown in FIG. 6A together, it may be seen that the light emitting period is progressed four times, respectively, even for the 11th row line to the 40th row line.

According to the example shown in FIG. 6B, the first light emitting period 62 of the plurality of light emitting periods for the first row line may be temporally consecutive with the data setting period 61 for the first row line, and the plurality of light emitting periods 62 to 65 each have a predetermined time interval. This is the same as the remaining row lines.

According to an embodiment, the predetermined time interval between the light emitting periods and the number of light emitting periods proceeding in each row line during one image frame period may be set based on the size of the display panel 100 and/or the shutter speed of the camera, or the like. However, an embodiment is not limited thereto.

Since the shutter speed of the camera is several times faster than one image frame time, the image displayed on the display panel 100 taken in the camera may be distorted, if the display panel 100 is driven so that one light emitting period is progressed in a row line sequence over one image frame time as shown in FIG. 3B or FIG. 3C.

As illustrated in FIG. 3D, the display panel 100 may be driven so that a plurality of light emitting periods are progressed at a predetermined time interval during one image frame time, and by setting a predetermined time interval based on the speed of the camera, the image displayed on the display panel 100 is not distorted even if the display panel 100 is captured at any moment.

The data set periods and the light emitting periods shown in FIG. 6B are merely shown to conceptually explain the data setting operation and the light emitting operation performed in a row line sequence. The detailed driving timing of the control signal (VST, SP) for the data setting, the control signal (SET, Emi_PWM, Sweep, Emi_PAM) for the light emitting operation is not limited to an embodiment illustrated in FIG. 6B.

Figure 6C:
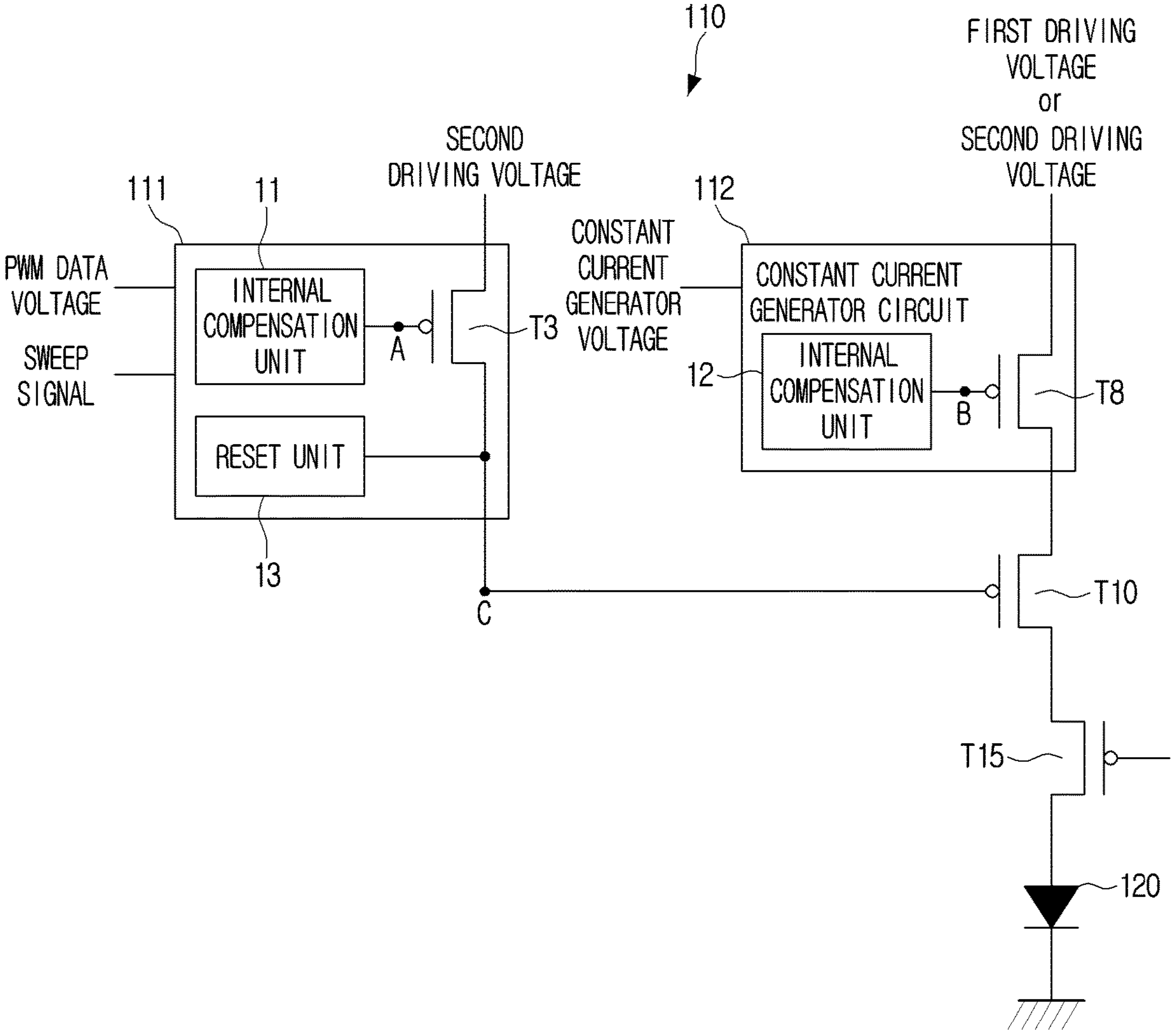
FIG. 6C is a configuration diagram of a sub-pixel circuit according to an embodiment.

FIG. 6C is a configuration diagram of the sub-pixel circuit 110 according to an embodiment. According to FIG. 6C, the sub-pixel circuit 110 includes the PWM circuit 111, the constant current generator circuit 112, a first switching transistor T10 and a second switching transistor T15.

The constant current generator circuit 112 includes a first driving transistor T8, and provides a constant current having a constant magnitude based on the voltage applied between the source terminal and the gate terminal of the first driving transistor T8 to the inorganic light emitting element 120.

When a constant current generator voltage is applied from the driver 200 in the data setting period, the constant current generator circuit 112 may apply a constant current generator voltage in which a threshold voltage of the first driving transistor T8 is compensated to the gate terminal B of the first driving transistor T8.

A difference of threshold voltages may exist between the first driving transistors T8 included in the sub-pixels of the display panel 100. In this example, the constant current generator circuit 112 of each sub-pixel may provide a driving current of a different magnitude by the difference of the threshold voltage of the first driving transistor T8 even though the same constant current generator voltage is applied, which results in a stain of an image, or the like.

Therefore, the threshold voltage deviation of the first driving transistors T8 included in the display panel 100 needs to be compensated.

To this end, the constant current generator circuit 112 includes an internal compensation unit 12. When a constant current generator voltage is applied, the constant current generator circuit 112 may apply the first voltage based on a threshold voltage of the first driving transistor T8 and the constant current generator voltage to a gate terminal B of the first driving transistor T8 through the internal compensation unit 12.

Thereafter, in the light emitting period, the constant current generator circuit 112 may provide a constant current of a magnitude based on the first driving voltage applied to the source terminal of the first driving transistor T8 and the first voltage applied to the gate terminal of the first driving transistor T8 to the inorganic light emitting element 120 through the turned-on first driving transistor T8.

Accordingly, the constant current generator circuit 112 may provide a driving current of a magnitude corresponding to an applied constant current generator voltage to the inorganic light emitting element 120 regardless of the threshold voltage of the first driving transistor T8.

Meanwhile, referring to FIG. 6C, a source terminal of a first switching transistor T10 is connected to a drain terminal of the first driving transistor T8, and the drain terminal of the first switching transistor T10 is connected to the source terminal of a second switching transistor T15. A source terminal of the second switching transistor T15 may be connected to the drain terminal of the first switching transistor T10, and the drain terminal of the second switching transistor T15 may be connected to the anode terminal of the inorganic light emitting element 120. The constant current may be provided to the inorganic light emitting element 120 while the first switching transistor T10 and the second switching transistor T15 are turned on.

The PWM circuit 111 may include the second driving transistor T3, and control the time that the constant current flows in the inorganic light emitting element 120 by controlling the on/off operation of the first switching transistor T10.

When a PWM data voltage is applied from the driver 200 in the data setting period, the PWM circuit 111 may set the PWM data voltage in which the threshold voltage of the second driving transistor T3 is compensated on the gate terminal A of the second driving transistor T3.

The problem of threshold voltage deviation between the first driving transistors T8 described above may occur for the second driving transistor T3 in the same manner, and the PWM circuit 111 may include the internal compensation unit 11 as well.

The PWM circuit 111 may, when the PWM data voltage is applied, set the second voltage based on the threshold voltage of the second driving transistor T3 and the PWM data voltage to the gate terminal A of the second driving transistor T3.

After the second driving transistor T3 is turned on based on the sweep signal applied in the light emitting period, the PWM circuit 111 may apply the second driving voltage to the gate terminal of the first switching transistor T10 to turn off the first switching transistor T10, and may control the time during which the constant current flowing the inorganic light emitting element 120. At this time, the second driving transistor T3 may be turned on, if the second voltage set to the gate terminal according to the sweep signal applied to the PWM circuit 111 changes, so that the voltage between the gate terminal and the source terminal becomes a threshold voltage of the second driving transistor T3.

The sweep signal is a voltage applied by the driver 200 to change voltage of the gate terminal of the second driving transistor T3, and is a voltage signal that sweeps between two different voltages. For example, the sweep signal may be a signal that changes linearly such as a triangular wave but is not limited thereto.

The PWM circuit 111 may enable the constant current to flow over the inorganic light emitting element 120 only during the time corresponding to the applied PWM data voltage, regardless of the threshold voltage of the second driving transistor T3.

The PWM circuit 111 includes a reset unit 13. The reset unit 13 is configured to forcibly turn on the first switching transistor T10. As described above, the first switching transistor T10 needs to be turned on so that the constant current flows over the inorganic light emitting element 120 to make the inorganic light emitting element 120 emit light. Accordingly, the first switching transistor T10 may be turned on at the start point of each light emitting period through the operation of the reset unit 13.

The second switching transistor T15 may be turned on and off according to the control signal (Emi_PAM to be described below).

The first driving voltage is a driving voltage used when the constant current generator circuit 112 supplies a driving current (i.e., constant current) to the inorganic light emitting element 120 in the light emitting period, and the second driving voltage is a driving voltage used when setting a data voltage (e.g., PWM data voltage, constant current generator voltage) to the sub-pixel circuit 110 in the data setting period.

When a driving current flows over the inorganic light emitting element 120, an infrared (IR) drop occurs, and accordingly, a voltage drop is generated in the first driving voltage. However, a precise data voltage needs to be set to the sub-pixel circuit 110 for the accurate gray-scale representation, and the driving voltage applied to the sub-pixel circuit 110 needs to be stable.

According to an embodiment, stable setting of the data voltage (i.e., PWM data voltage and constant current generator voltage) to the sub-pixel circuit 110 is available, by applying the second driving voltage without IR drop even to the constant current generator circuit 112 providing a driving current as well as the PWM circuit 111 in the data setting period.

Figure 6D:
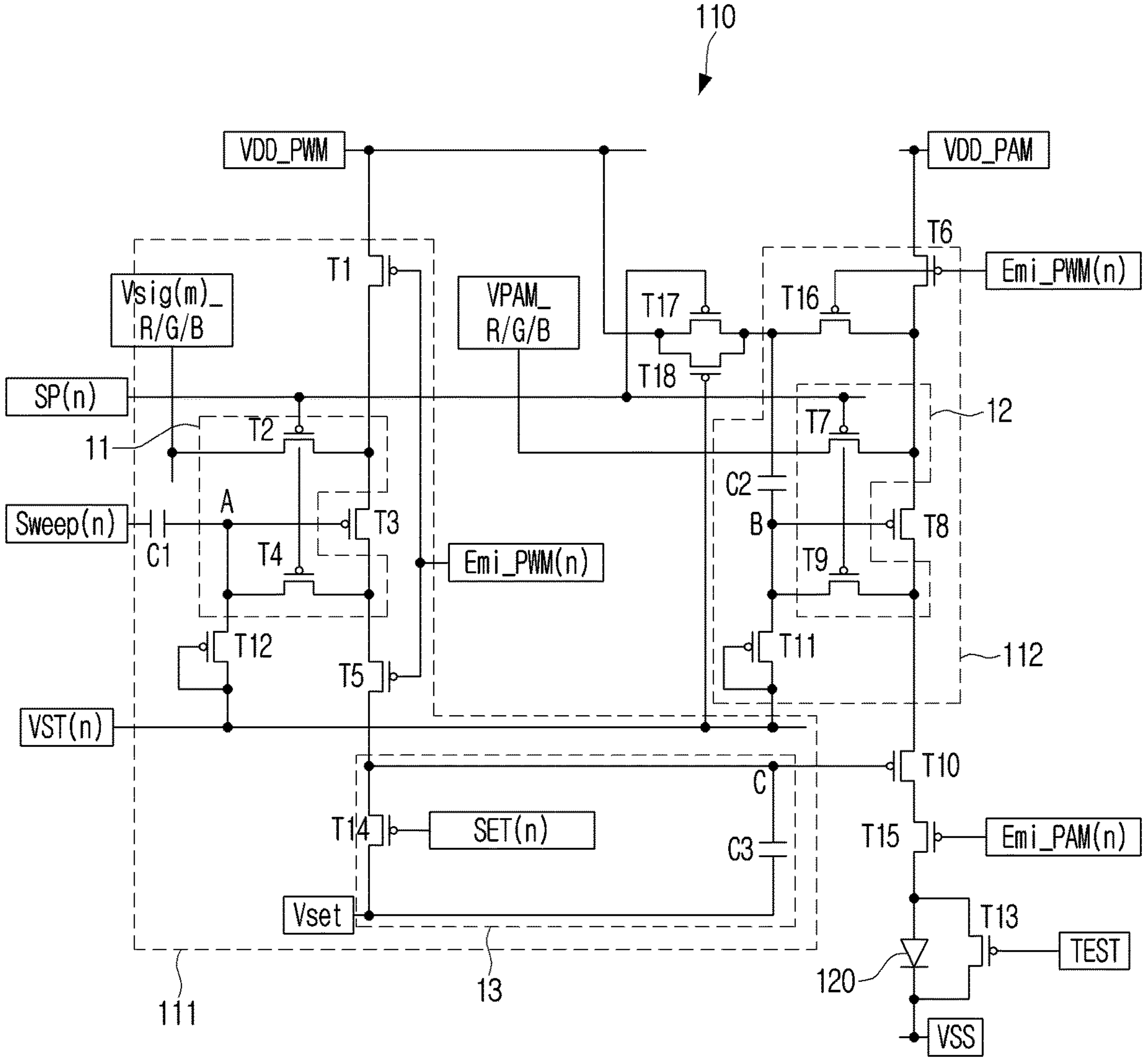
FIG. 6D is a detailed circuit diagram of a sub-pixel circuit according to an embodiment.

FIG. 6D is a detailed circuit diagram of the sub-pixel circuit 110 according to an embodiment. Referring to FIG. 6D, the sub-pixel circuit 110 includes the PWM circuit 111, the constant current generator circuit 112, the first switching transistor T10, and the second switching transistor T15. As described in FIG. 6C above, the PWM circuit 111 may include the internal compensation unit 11 and the reset unit 13, and the constant current generator circuit 112 may include the internal compensation unit 12.

A transistor T17 and a transistor T18 are circuits to apply the second driving voltage (VDD_PWM) to the constant current generator circuit 112 in the data setting period.

A transistor T13 is a circuit element that is turned on according to test voltage and is used to identify whether there is an abnormality in the sub-pixel circuit 110, before the inorganic light emitting element 120 is mounted on the TFT layer to be described and electrically connected to the sub-pixel circuit 110.

Referring to FIG. 6D, the VDD_PAM represents the first driving voltage (e.g., +10 [V]), VDD_PWM represents the second driving voltage (e.g., +10 [V]), VSS represents the ground voltage (e.g., 0 [V]), and Vset represents a low voltage (e.g., −3 [V]) for turning on the first switching transistor T10. The VDD_PAM, VDD_PWM, VSS, Vset and test voltages may be applied from the driving voltage providing circuit described above.

The VST(n) denotes a signal applied to the sub-pixel circuit 110 to initialize the voltage of the A node (the gate terminal of the second driving transistor T3) and the B node (gate terminal of the first driving transistor T8).

The SP(n) denotes a signal applied to the sub-pixel circuit 110 to set the data voltage (that is, PWM data voltage, constant current generator voltage).

The SET(n) denotes a signal applied to the reset unit 13 of the PWM circuit 111 to turn on the first switching transistor T10.

The Emi_PWM(n) denotes a signal for applying the second driving voltage (VDD_PWM) to the PWM circuit 111 by turning on the transistor T1 and the transistor T5, and applying the first driving voltage (VDD_PAM) to the constant current generator circuit 112 by turning on a transistor T6 and a transistor T16.

The sweep(n) denotes a sweep signal. According to an embodiment, the sweep signal may be a linearly decreasing voltage, but is not limited thereto. For example, when the transistors included in the sub-pixel circuit 110 are implemented as NMOS transistors, a linearly increasing voltage may be used as a sweep signal. The sweep signal may be repeatedly applied in the same form for each light emitting period.

The Emi_PAM(n) denotes a signal to turn on the second switching transistor T15.

In the above signals, n denotes the n-th row line. As described above, the driver 200 drives the display panel 100 by the row lines (or scan line or gate line), and the above-described control signals (VST(n), SP(n), SET(n), Emi_PWM(n), Sweep(n) and Emi_PAM(n)) may be applied to all sub-pixel circuits 110 included in the n-th row line, in the same manner as the order of FIG. 6E.

Accordingly, the control signal described above may be called scan signals or gate signals and may be applied from the gate driver described above.

The Vsig(m)_R/G/B denotes the PWM data voltage for each of the R, G, and B sub-pixels of the pixel included in the m-th column line. Since the gate signals described above are a signal for the n-th row line, the Vsig(m)_R/G/B shown in FIG. 6D indicates that the PWM data voltage for each of the R, G, and B sub-pixels of a particular pixel arranged where the n-th row line and the m-th column line cross, is time-division multiplexed and applied.

The Vsig(m)_R/G/B may be applied from the data driver described above. In addition, Vsig(m)_R/G/B may use, for example, a voltage between +10[V](black) to +15[V](full white), but is not limited thereto.

The sub-pixel circuit 110 illustrated in FIG. 6D illustrates the sub-pixel circuit 110 corresponding to a sub-pixel (e.g., R sub-pixel) of any one of R, G, and B sub-pixels, so that only the PWM data voltage for the R sub-pixel among the time-division multiplexed PWM data voltages may be selected and applied through the MUX circuit (not shown).

The VPAM_R/G/B denotes the constant current generator voltage for each of the R, G, and B sub-pixels included in the display panel 100. The same constant current generator voltage may be applied to the display panel 100.

However, the same constant current generator voltage means that the same constant current generator voltage is applied to the same kind of sub-pixels included in the display panel 100, but does not mean that the same constant current generator voltage is applied to all different kinds of sub-pixels as R, G, and B. The characteristics of R, G, and B sub-pixels are different depending on the kinds of sub-pixels. Therefore, the constant current generator voltage may be varied according to the kinds of sub-pixels.

In this example, the same constant current generator voltage is applied to the same kind sub-pixel, regardless of the column line or the row line. According to an embodiment, the constant current generator voltage may be applied to each kind of a sub-pixel directly from the driving voltage providing circuit without using a data driver, unlike the PWM data voltage.

Since the same voltage is applied to the same kind of sub-pixel regardless of the column line or the row line, the DC voltage may be used as a constant current generator voltage. For example, three kinds of DC voltages (e.g., +5.1 [V], +4.8 [V], +5.0 [V]) corresponding to each of the R, G, and B sub-pixels may be individually applied to each of the R, G, and B sub-pixel circuits of the display panel 100 from the driving voltage providing circuit. In this example, the MUX circuit is not required.

According to an embodiment, when using the same constant current generator voltages for the different kinds of sub-pixels shows a better characteristic, the same constant current generator voltage may be applied to different types of sub-pixels.

Figure 6E:
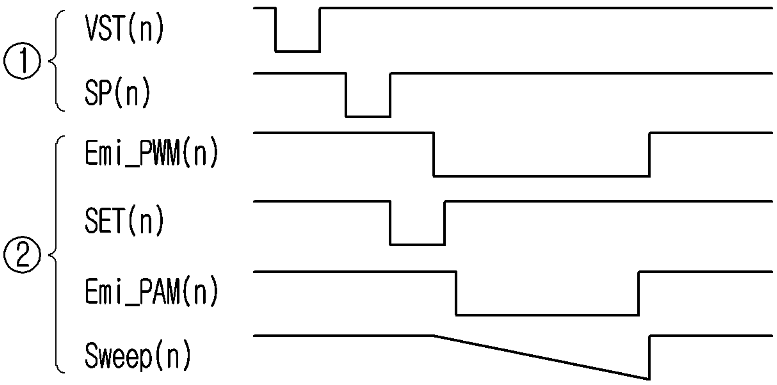
FIG. 6E is a timing diagram for the gate signals described above in FIG. 6D.

FIG. 6E is a timing diagram for the gate signals described above in FIG. 6D.

The VST(n) and the SP(n)(①) of the gate signals shown in FIG. 6E are associated with the data setting operation of the sub-pixel circuit 110 and may be called a scan signal. Among the gate signals illustrated in FIG. 6E, Emi_PWM(n), SET(n), Emi_PAM(n) and Sweep(n)(②) are associated with the light emitting operation of the sub-pixel circuit 110 and may be referred to as an emission signal.

As described above, according to an embodiment, for each row line during one image frame period, data setting period may be progressed once and the light emitting period may be progressed for a plurality of times.

Accordingly, ① signals may be applied to each row line of the display panel 100 once per one image frame, and ② signals may be applied to each row line of the display panel 100 for a plurality of times per one image frame.

Figure 6F:
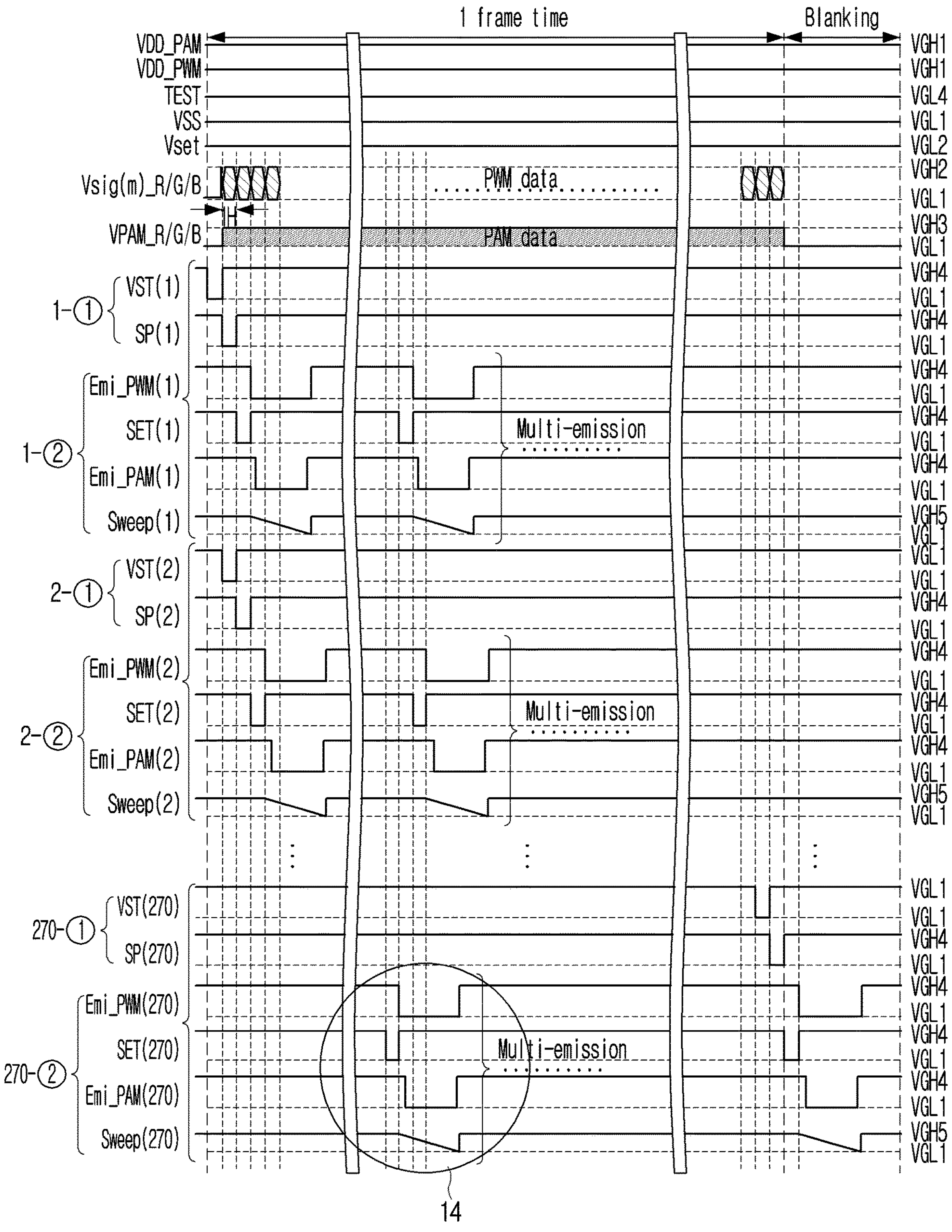
FIG. 6F is a timing diagram of various signals for driving a display panel during one image frame period according to an embodiment.

FIG. 6F is a timing diagram of various signals for driving the display panel 100 during one image frame period according to an embodiment. Referring to FIG. 6F, the display panel 100 includes 270 row lines.

Referring to reference number 1-①, 2-① to 270-①, the scan signals (VST(n), SP(n)) for data setting operation may be applied once to each row line in the row line sequence for one frame period.

Referring to reference number 1-②, 2-② to 270-②, the emission signals (Emi_PWM(n), SET(n), Emi_PAM(n) and Sweep(n)) for light emission operation may be applied several times to each row line.

According to an embodiment, among light emitting periods proceeding in the entire row line of the display panel 100 during the one image frame period, some light emitting periods (e.g., upper light emitting periods on the basis of the line connecting the data setting periods in FIG. 6B) may be progressed on the basis of the data voltage applied during the one image frame period, and the remaining light emitting periods (e.g., lower light emitting periods with respect to the line connecting the data setting periods) may be progressed on the basis of the data voltages applied during a previous image frame period of the one image frame period.

Among the light emission operations by the gate signals as illustrated in FIG. 6F, the light emission operations by the emission signals of reference number 14 is a light emission operation based on the data voltage applied in the previous image frame period.

With reference to FIGS. 7A to 13, a working example of the driver 200 according to various embodiments to provide the gate signals as illustrated in FIG. 6D will be described.

Figure 7A:
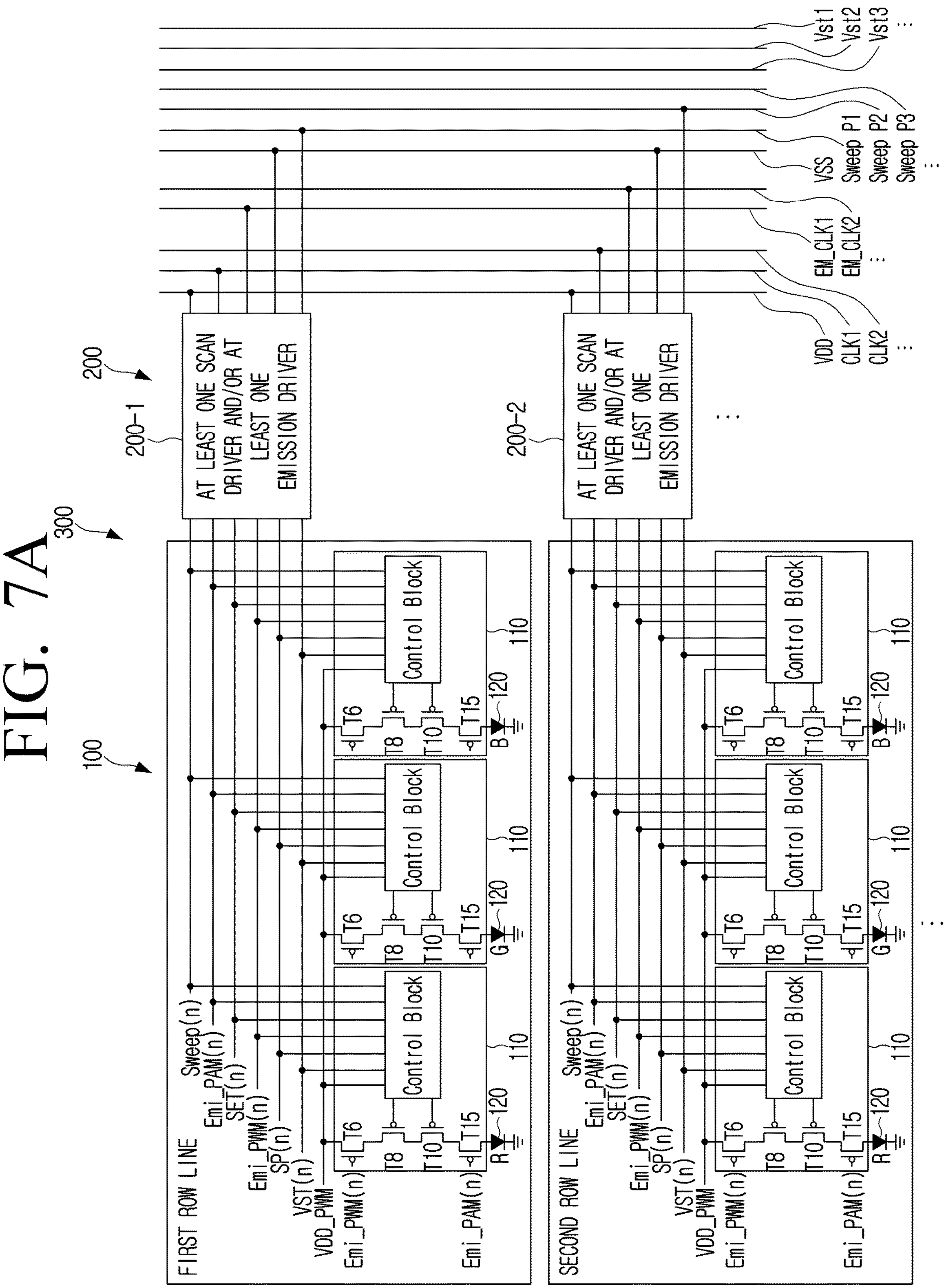
FIG. 7A is a block diagram of a display module according to an embodiment.

FIG. 7A is a block diagram of the display module 300 according to an embodiment. As illustrated in FIG. 7A, the display module 300 includes the display panel 100 and the driver 200.

The driver 200 may include gate drivers provided in each row line to provide gate signals (e.g., VST(n), SP(n), Emi_PWM(n), SET(n), Emi_PAM(n) and Sweep(n)) to each row line.

FIG. 7A illustrates the first gate driver 200-1 for providing gate signals to a first row line and the second gate driver 200-2 for providing gate signals to a second row line.

According to FIG. 7A, each gate driver 200-1 and 200-2 may receive a drive voltage signal (VDD, VSS), a clock signal for generating scan signals (CRK1, CRK2 . . . ), a clock signal for generating an emission signal (EM_CLK1 . . . ), an input sweep signal (Sweep1, Sweep2, Sweep3 . . . ) and a start signal (Vst1, Vst2, Vst3 . . . ) to generate gate signals, and may provide the generated gate signals to the corresponding row line (specifically, sub-pixel circuits included in the row line).

Each gate driver 200-1 and 200-2 may be implemented through the combination of at least one scan driver and/or at least one emission driver. The detailed description will be provided with reference to FIGS. 8A to 13.

Figure 7B:
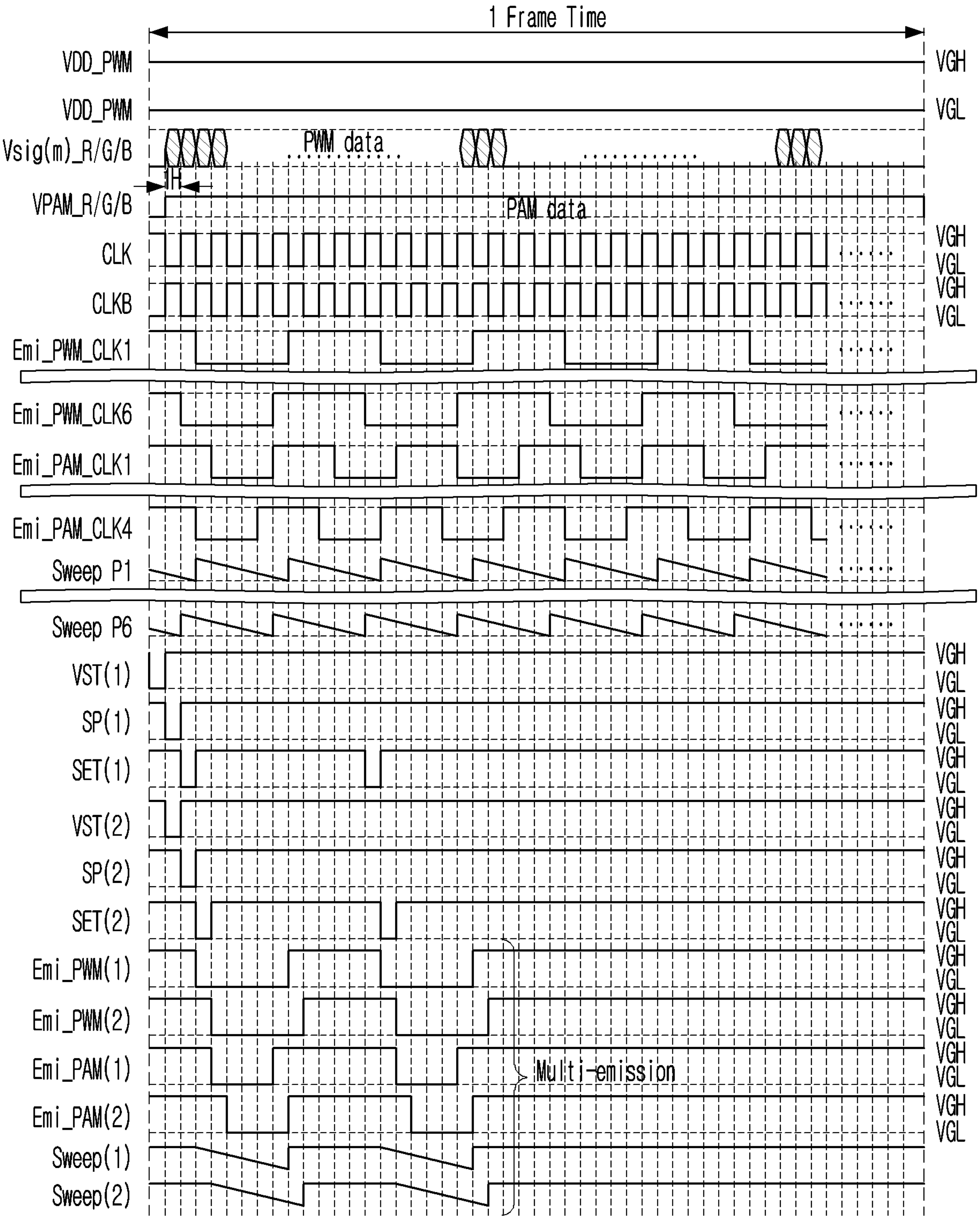
FIG. 7B is a timing diagram of gate signals output from a gate driver when an input sweep signal and various clock signals are input during a frame time according to an embodiment.

FIG. 7B is a timing diagram of gate signals output from a gate driver when an input sweep signal and various clock signals are input during a frame time according to an embodiment.

Referring to FIG. 7B, for generating the scan signal (VST(n) and SP(n)), two-phase clock signals (CRK, CRKB) may be input to the gate driver 200-1, 200-2.

For the generation of emission signals (Emi_PWM(n), SET(n), Emi_PAM(n) and Sweet(n)), six-phase Emi_PWM clock signals (Emi_PWM_CLK1 to Emi_PWM_CLK6), four-phase Emi_PAM clock signals (Emi_PAM_CLK1 to Emi_PAM_CLK4) and six-phase input sweep signals (SweepP1 to SweepP6) may be input to the gate driver 200-1, 200-2.

The gate driver 200-1, 200-2 may apply scan signals and emission signals to each row line in the row line sequence as illustrated in FIG. 7B.

The number of different phases of the input sweep signals, and the number of different phases of the various clock signals in FIG. 7B are merely exemplary and may be changed according to an embodiment, and is not limited to an embodiment shown in FIG. 7B.

Figure 8A:
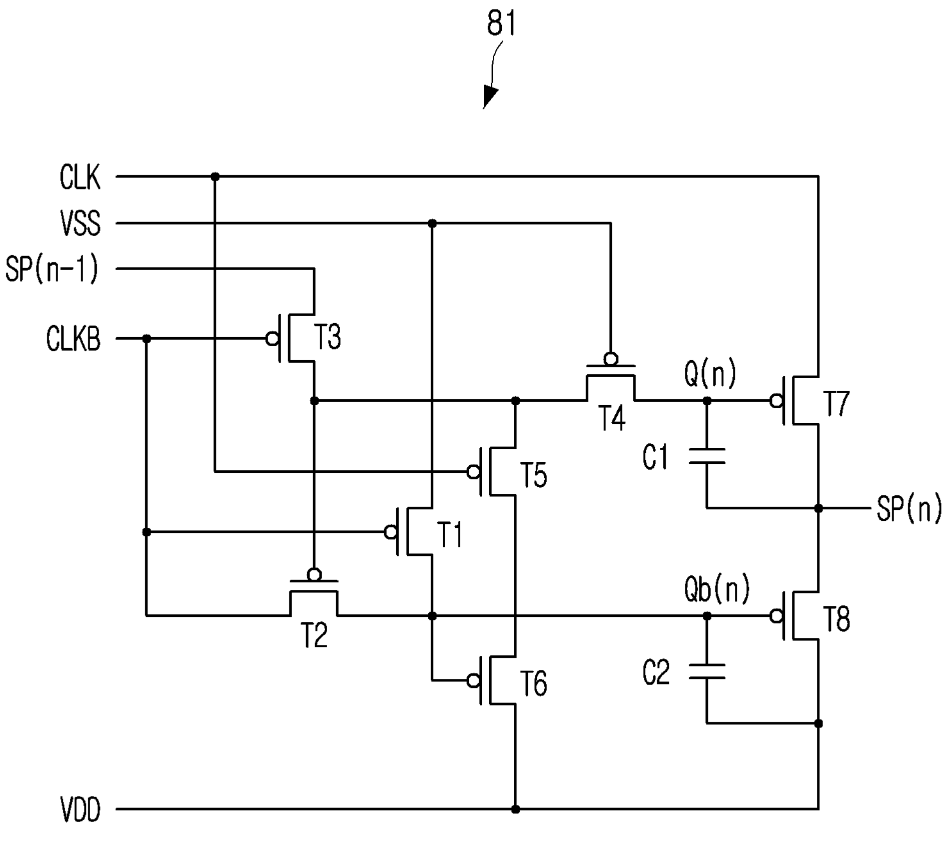
FIG. 8A is a circuit diagram of a scan driver according to an embodiment.
Figure 8B:
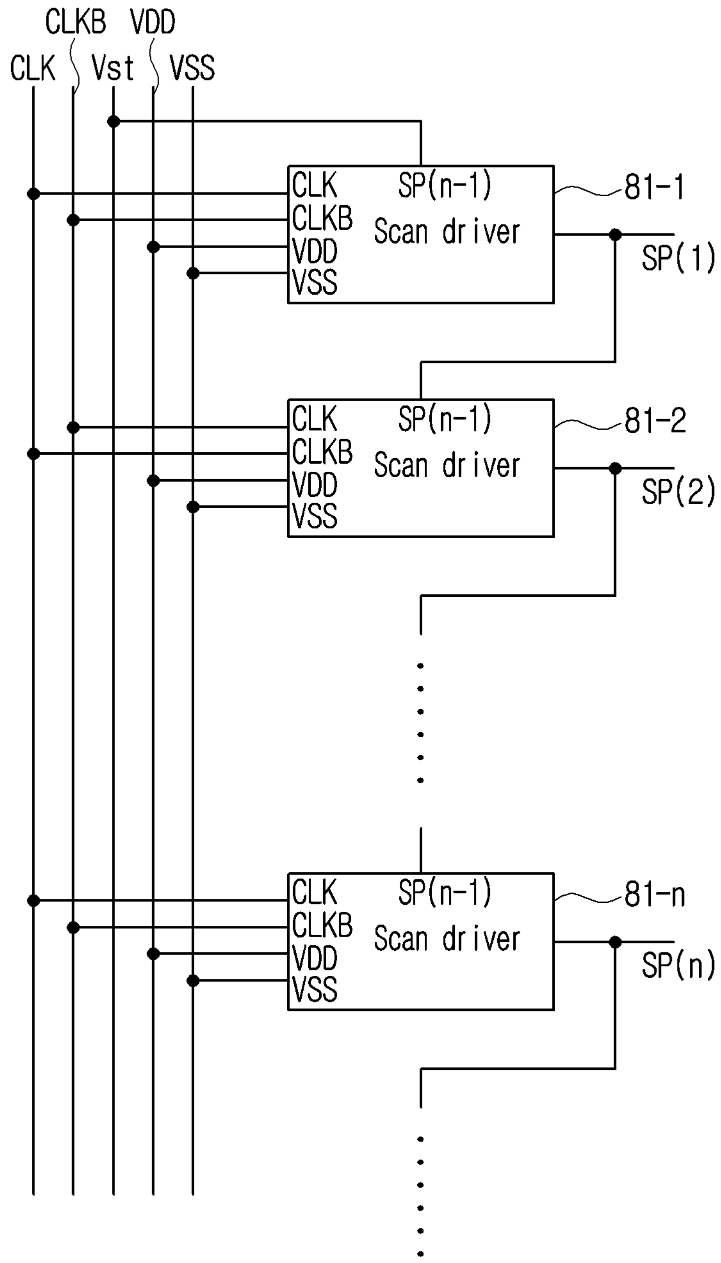
FIG. 8B illustrates a connection relationship between scan drivers according to an embodiment.
Figure 8C:
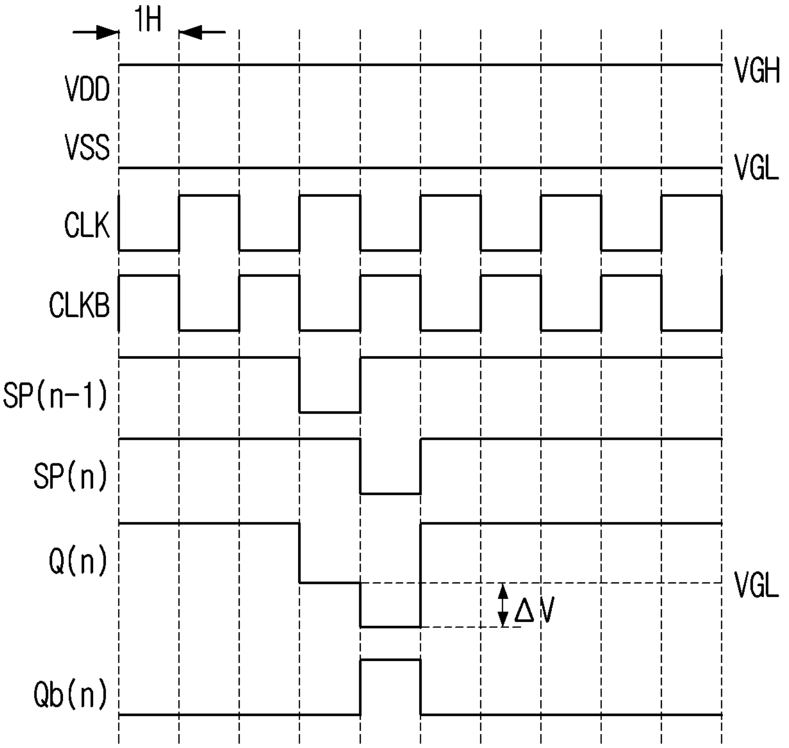
FIG. 8C is a timing diagram of various signals for driving a scan driver according to an embodiment.

FIGS. 8A to 8C are diagrams of an embodiment to generate a gate signal using a scan driver.

FIG. 8A is a circuit diagram of a scan driver 81 according to an embodiment. As illustrated in FIG. 8A, the scan driver 81 may generate a scan signal SP(n).

The scan driver 81 may receive clock signals (CLK, CLKB) having opposite phases, driving voltage signals (VDD and VSS), and scan signal SP(n−1) applied to the previous row line, and may output the scan signal SP(n).

FIG. 8B illustrates a connection relationship between scan drivers according to an embodiment. As described above, the scan signal SP(n) is applied to the display panel 100 in a row line sequence. The scan drivers 81-1 to 81-*n*, which are provided for each row line, may be connected to each other as shown in FIG. 8B.

Referring to FIG. 8B, the output signal SP(1) of the scan driver 81-1 for the first row line may be input to the scan driver 81-2 as the start signal of the scan driver 81-2 for the second row line, which is the next row line. This applies up to the scan driver 81-*n* for the n-th row line. A separate start signal (Vst) is applied to the scan driver 81-1 for the first row line.

Referring to FIG. 8B, in the scan drivers 81-1 to 81-*n* for each row line, the clock signals CLK and CLKB are input in an opposite order to a previous row line in every row line. The CLK signal may be input to the CLK input end of the scan driver 81-1, and the CLKB signal may be input to the CLKB input end. The CLKB signal may be input to the CLK input end of the scan driver 81-2 for the next row line, and the CLK signal may be input to the CLKB input end. This is the same up to the scan driver 81-*n* for the n-th row line.

FIG. 8C is a timing diagram of various signals for driving a scan driver according to an embodiment.

The process of outputting the scan signal SP(n) is described with reference to FIGS. 8A and 8C. First, when the scan signal SP(n−1) is input to the scan driver 81, the Q(n) node voltage becomes low. Then, as the CLK signal become low, the Q(n) node voltage is bootstrapped, and accordingly, the transistor T7 may be fully turned on to output an output signal, i.e., SP(n). The other operation may be readily understood by those of ordinary skill in the art in relation to a signal applied to the configuration of the circuit, and thus a more detailed description will be omitted.

It has been described that the scan signal SP(n) is generated using the scan driver 81, but the same circuit and the same driving method described above may be applied to the generation of the scan signal VST(n) or the emission signal SET(n) as described above with reference to FIGS. 8A to 8C.

Figure 9A:
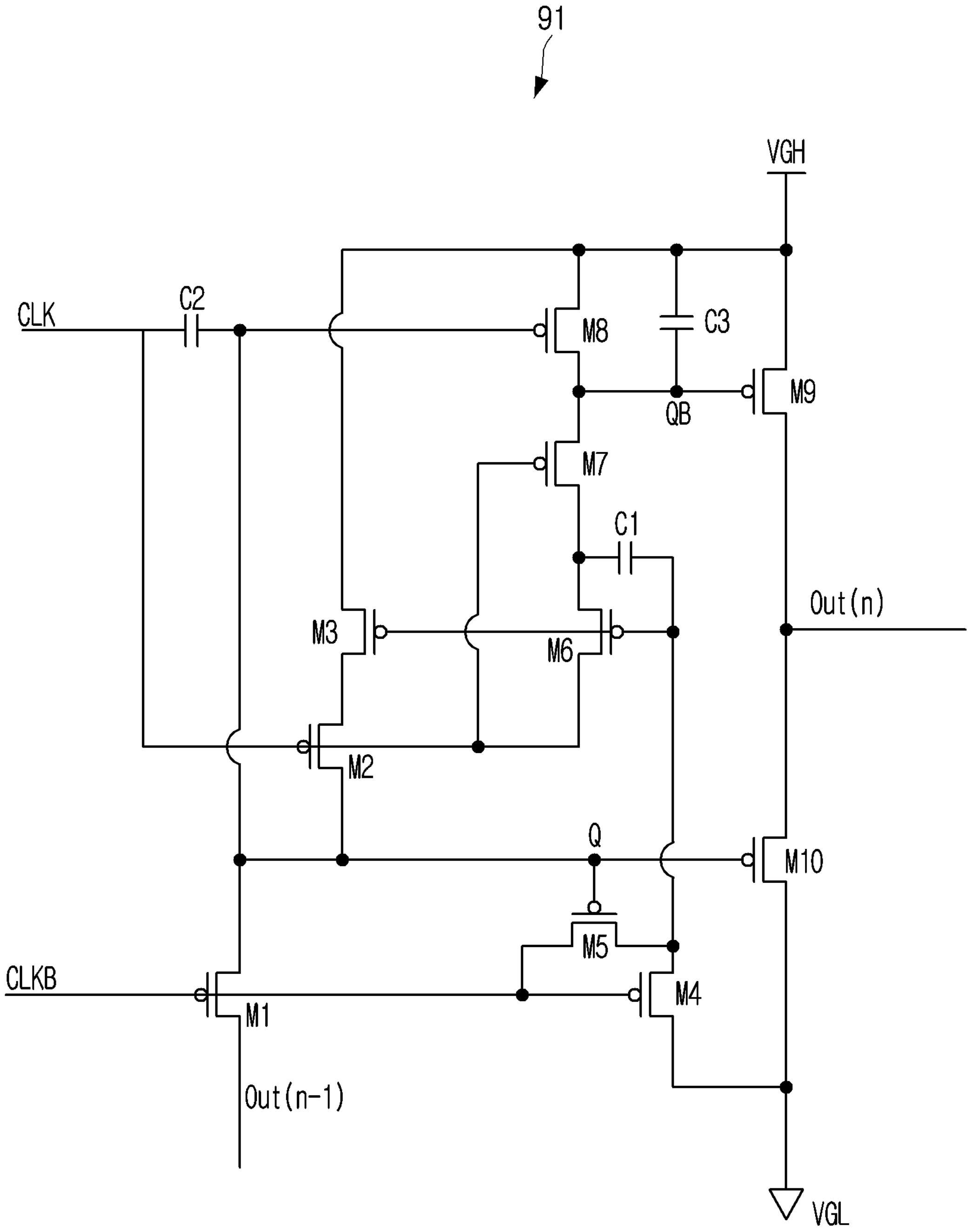
FIG. 9A is a circuit diagram of an emission driver according to an embodiment.
Figure 9B:
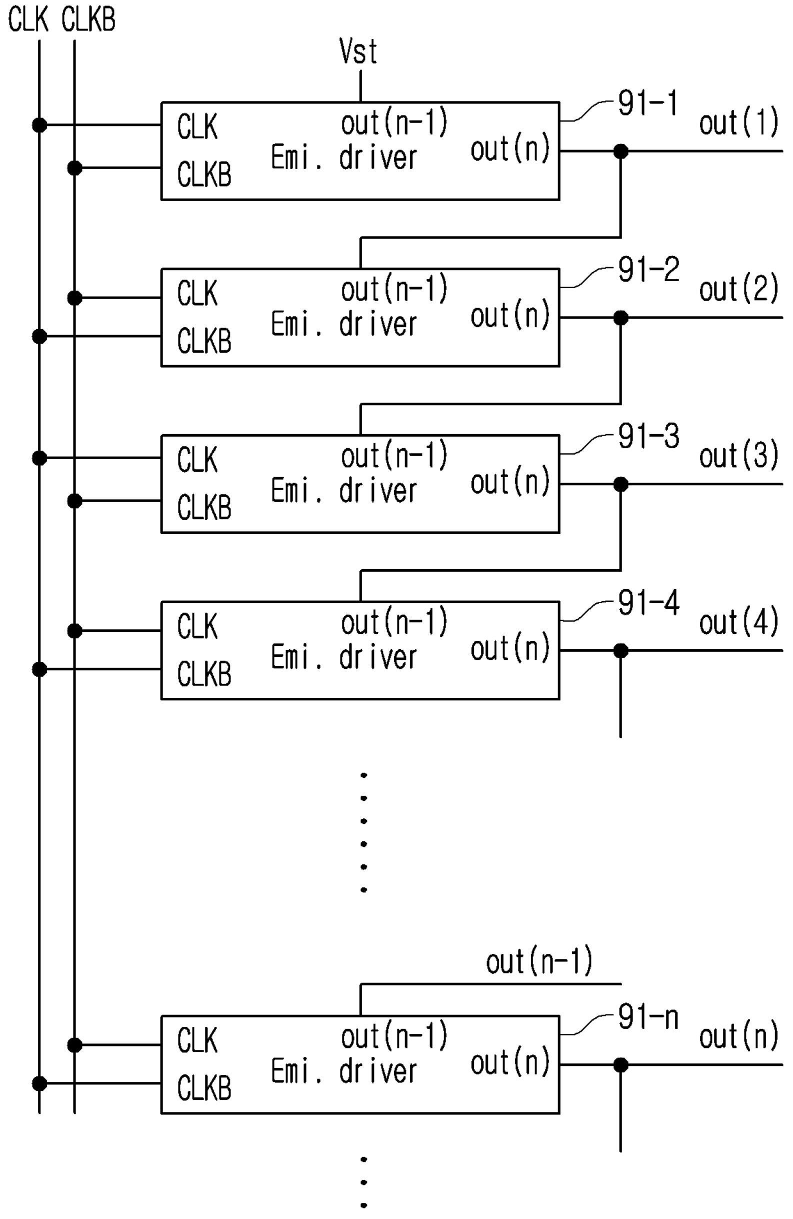
FIG. 9B illustrates a connection relationship between emission drivers according to an embodiment.
Figure 9C:
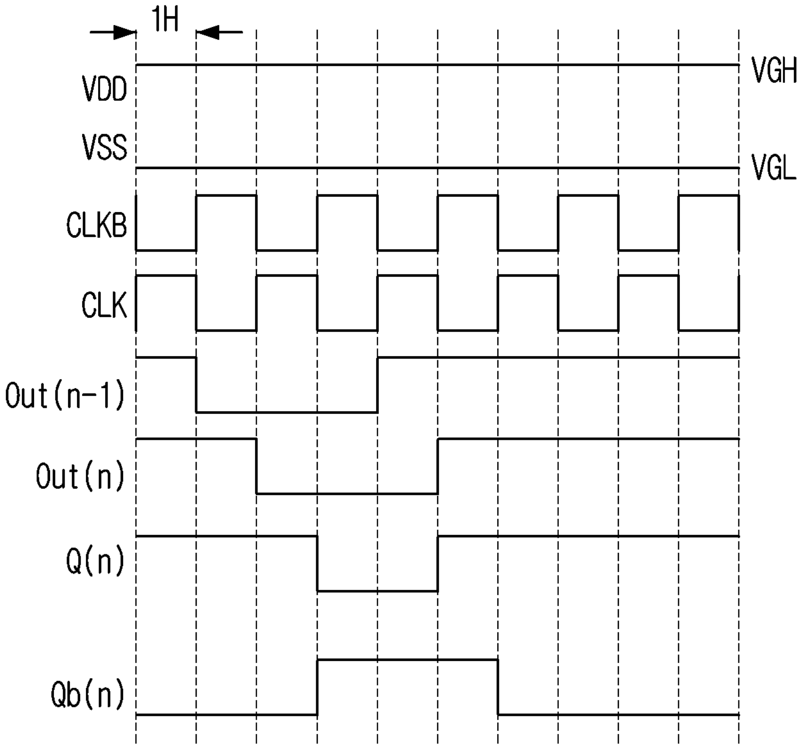
FIG. 9C is a timing diagram of various signals for driving an emission driver according to an embodiment.

FIGS. 9A to 9C are diagrams for illustrating an embodiment of generating a gate signal using an emission driver. In FIGS. 9A to 9C, the output signal Out(n) may correspond to any one of an emission signal Emi_PWM(n), an emission signal Emi_PAM(n), or an emission signal SET(n) according to an embodiment.

FIG. 9A is a circuit diagram of an emission driver 91 according to an embodiment. Referring to FIG. 9A, the emission driver 91 may generate an output signal Out(n). The emission driver 91 may receive clock signals (CLK, CLKB) having opposite phases, driving voltage signals (VGH, VGL), and output signal Out(n−1) applied to the previous row line to output the output signal Out(n).

FIG. 9B illustrates a connection relationship between emission drivers according to an embodiment. As described above, since the light emitting period proceeds in the order of row lines, emission signals are also applied to the display panel 100 in the order of row lines. The emission drivers 91-1 to 91-*n*, which are provided for each row line, may be connected to each other as shown in FIG. 9B.

Referring to FIG. 9B, an output signal (Out (1)) of the emission driver 91-1 for the first row line may be input to the emission driver 91-2 as a start signal of an emission driver 91-2 for a second row line, which is a next row line. This is the same up to the emission driver 91-*n* for the n-th row line. A separate start signal Vst is applied to the emission driver 91-1 for the first row line.

Referring to FIG. 9B, in the emission drivers 91-1 to 91-*n* for each row line, the clock signals CLK and CLKB are input in the opposite direction from the previous row line for each row line. The CLK signal may be input to the CLK input end of the emission driver 91-1, and the CLKB signal may be input to the CLKB input end. However, the CLKB signal may be input to the CLK input end of the emission driver 91-2 for the next row line, and the CLK signal may be input to the CLKB input end. This is the same up to the emission driver **91-*n*** for the n-th row line.

FIG. 9C is a timing diagram of various signals for driving the emission driver 91 in accordance with an embodiment. As shown in FIG. 9C, the output signal Out(n−1) for the n−1-th row line and the output signal Out(n) for the n-th row line are sequentially generated in a row line sequence.

A more specific operation of the emission driver 91 will be apparent to those of ordinary skilled in the art through the circuit configuration of FIG. 9A, the connection relationship of the emission drivers 91-1 to **91-*n* shown in FIG. 9B, and the timing diagram shown in FIG. 9**C, and thus the detailed description thereof will be omitted.

Figure 10A:
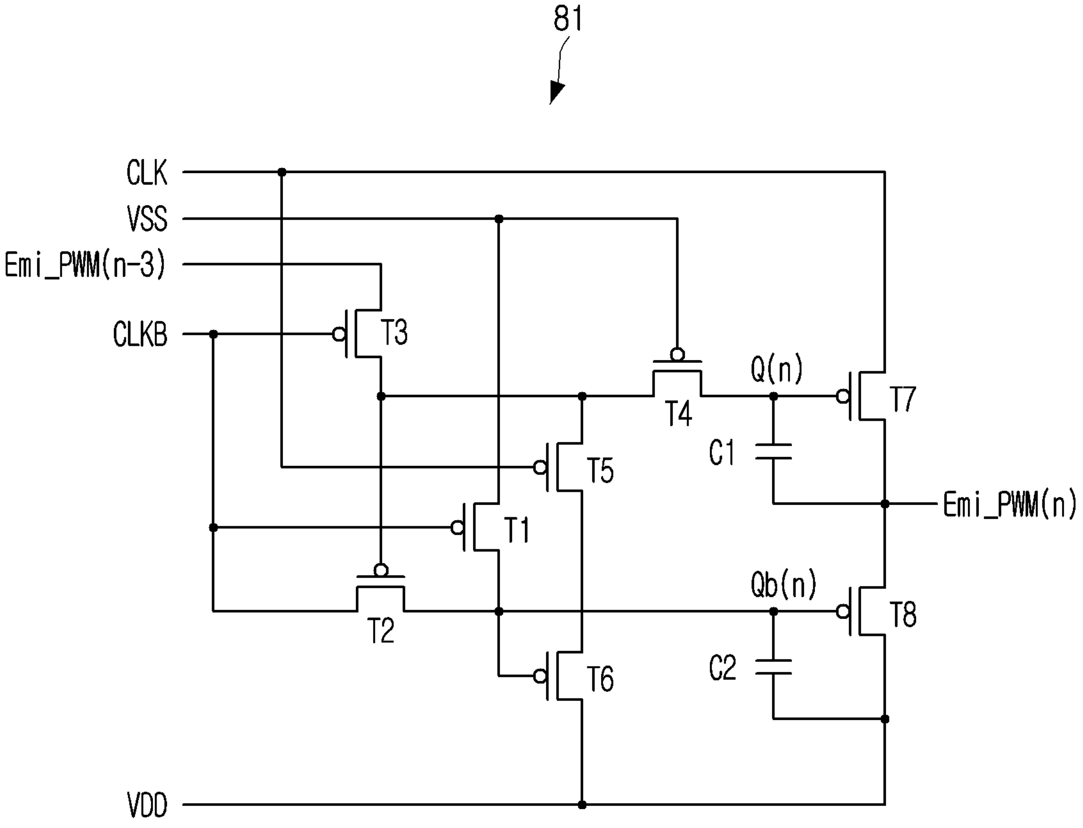
FIG. 10A is a circuit diagram of a scan driver according to an embodiment.
Figure 10B:
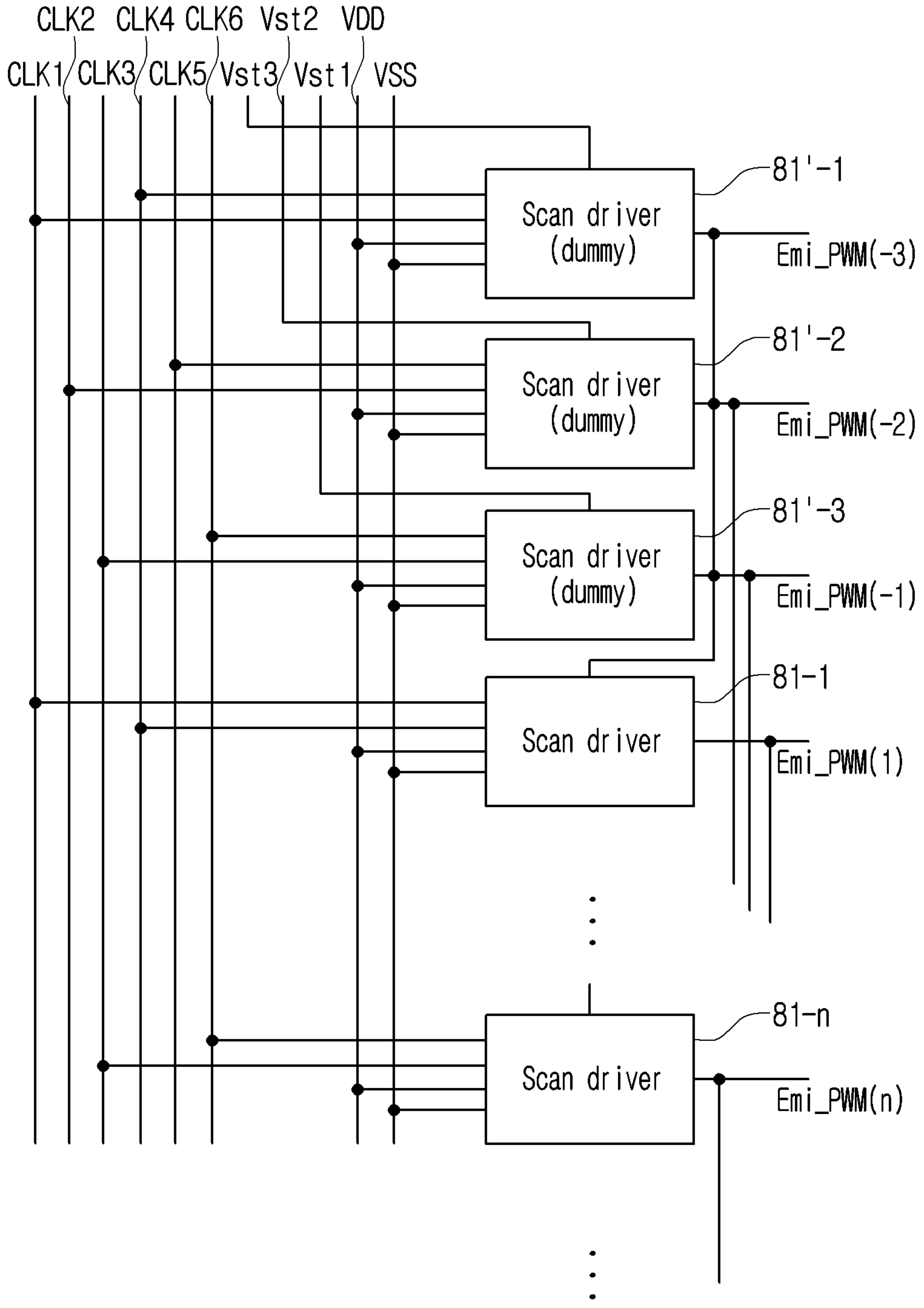
FIG. 10B illustrates a connection relationship between scan drivers according to an embodiment.
Figure 10C:
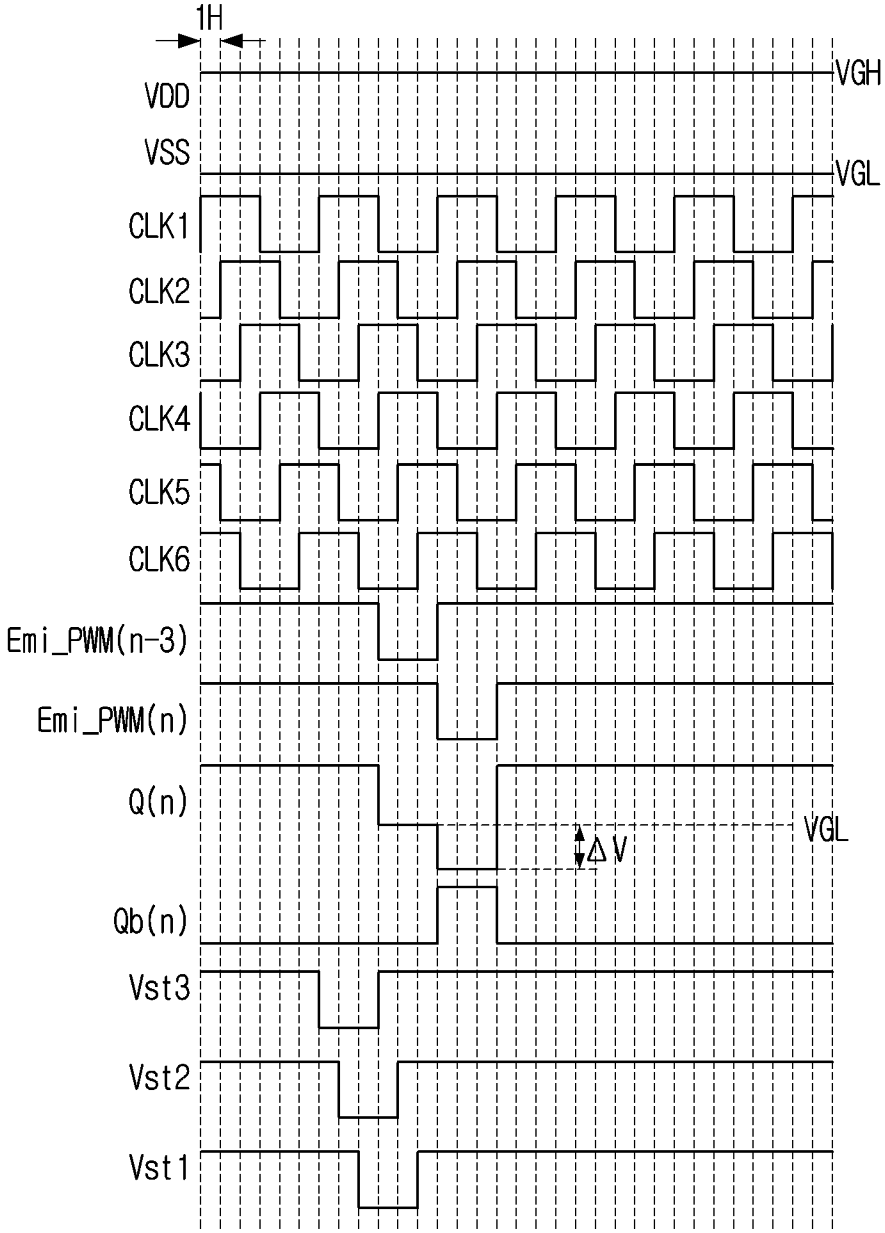
FIG. 10C is a timing diagram of various signals for driving a scan driver according to an embodiment.

FIGS. 10A to 10C are diagrams of another embodiment of generating a gate signal using a scan driver.

FIG. 10A is a circuit diagram of the scan driver 81 according to an embodiment. The scan driver 81 of FIG. 10A has the same circuit configuration as the scan driver 81 of FIG. 8A.

But, the scan driver 81 of FIG. 10A is different from the scan driver 81 shown in FIG. 8A in that the emission signal Emi_PWM(n) is output by receiving the two clock signals having opposite phases among the six clock signals having different phases and the emission signal Emi-PWM(n−3) applied to the row lines which are ahead by three row lines.

FIG. 10B illustrates a connection relationship between scan drivers according to an embodiment. Referring to FIG. 10B, there are three dummy scan drivers 81'-1 to 81'-3 unlike FIG. 8B. This is because scan drivers 81-1 to **81-*n*** for each row line need to receive the emission signal Emi_PWM (n−3) applied to the row lines ahead by three row lines as a start signal.

Accordingly, as illustrated in FIG. 10B, the first dummy scan driver 81'-1 may receive the clock signals CLK1 and CLK4 and the start signal Vst3, and may output an Emi_PWM (-3) signal. The output Emi_PWM(-3) signal is input to the start signal of the scan driver 81-1 for the first row line.

The second dummy scan driver 81'-2 may receive clock signals CLK2 and CLK5, the start signal Vst2 and output Emi_PWM(-2) signal. The output Emi_PWM(-2) signal may be input as the start signal of the scan driver (not shown) for the second row line.

The third dummy scan driver 81'-3 may receive clock signals CLK3 and CLK6, and a start signal Vst1 to output Emi_PWM(-1) signal. The output Emi_PWM(-1) signal may be input to the start signal of the scan driver (not used) for the third row line.

To the scan drivers 81-1 to **81-*n* for each row line, the clock signals which are the same as the clock signals applied to the row lines ahead by three row lines are applied. To the scan driver 81-1 for the first row line, CLK1 and CLK4, which are the same clock signal as the clock signal applied to the first dummy scan driver 81'-1**, are applied. Although not shown in the figures, the remaining scan drivers are also same.

FIG. 10C is a timing diagram of various signals for driving a scan driver according to an embodiment.

Referring to FIG. 10C, six clock signals CLK1 to CLK6 have different phases. The clock signals CLK1 and CLK4 may have opposite phases, CLK1 and CLK5 may have opposite phases, and CLK3 and CLK6 may have opposite phases.

Referring to FIG. 10C, since the emission signal Emi_PWM(n−3) and the emission signal Emi-PWM(n) are generated at a time interval as much as 3H, it is sufficiently predicted that the emission signal Emi-PWM(n−1) and the emission signal Emi_PWM(n) are generated in a row line sequence with a time interval as 1H, such as Out(n−1) and out(n) of FIG. 9C.

Since a more detailed operation of the scan driver 81 would be understood by those skilled in the art through the circuit configuration shown in FIG. 10A, and the connection relation of the scan drivers 81'-1 to 81'-3, 81-1 to **81-*n* shown in FIG. 10B, and the timing diagram shown in FIG. 10**C, a more detailed description will be omitted.

It has been described generating the emission signal Emi_PWM(n) using six clock signals having different phases and the scan driver 81, but the same circuit and same driving method as illustrated in FIG. 10A to FIG. 10C may be applied to generation of the emission signal Emi_PAM(n) or emission signal SET(n).

Figure 11A:
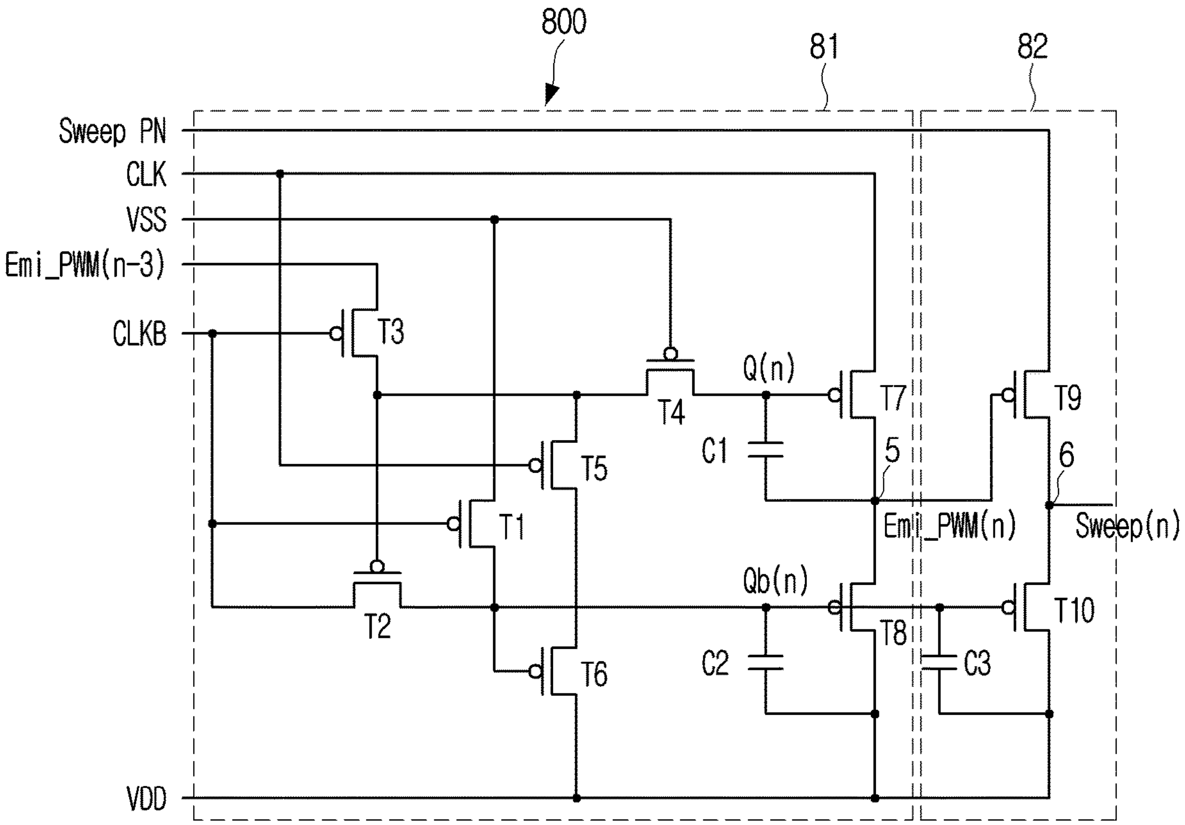
FIG. 11A is a circuit diagram of a sweep/scan driver according to an embodiment.
Figure 11B:
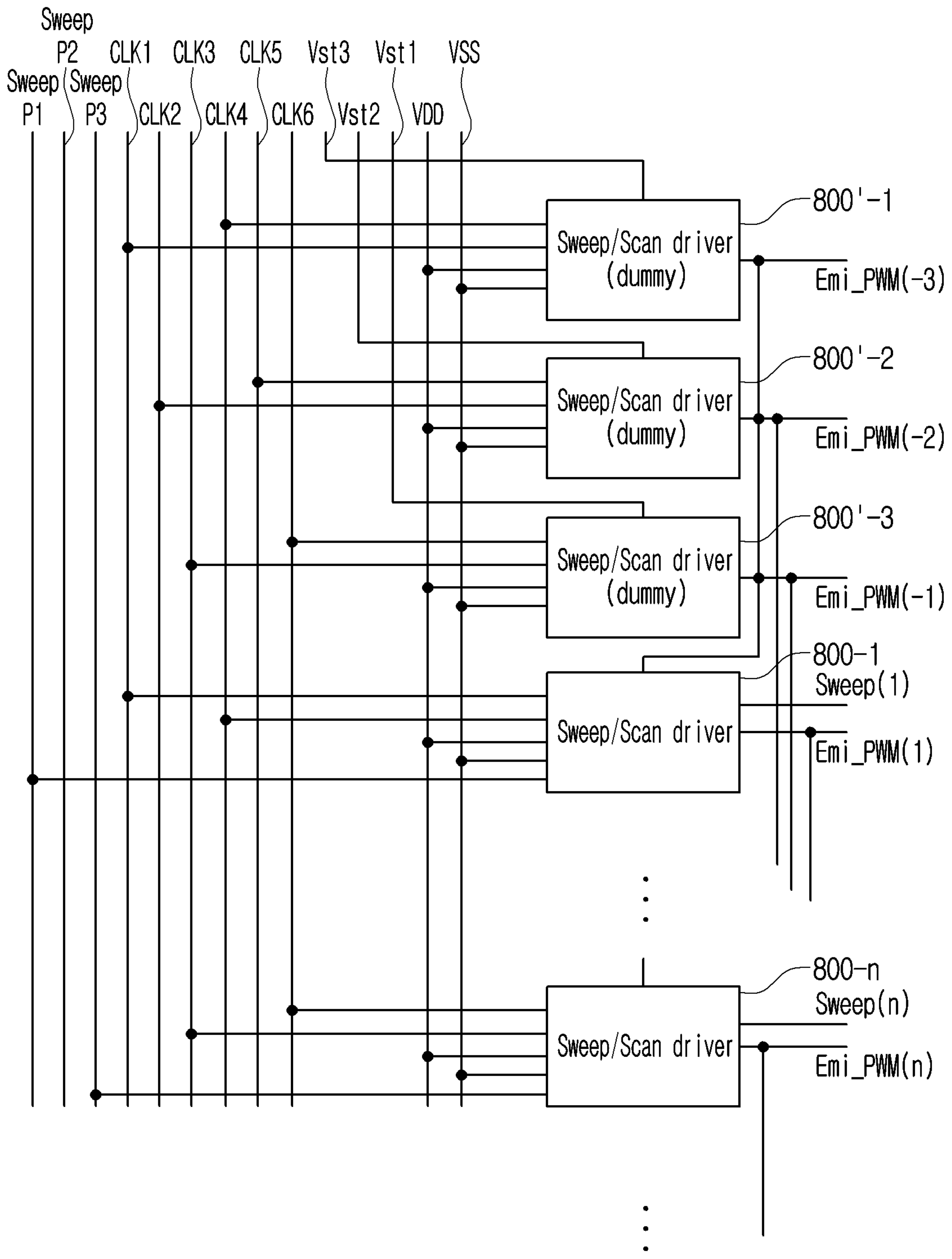
FIG. 11B illustrates a connection relationship between sweep/scan drivers according to an embodiment.
Figure 11C:
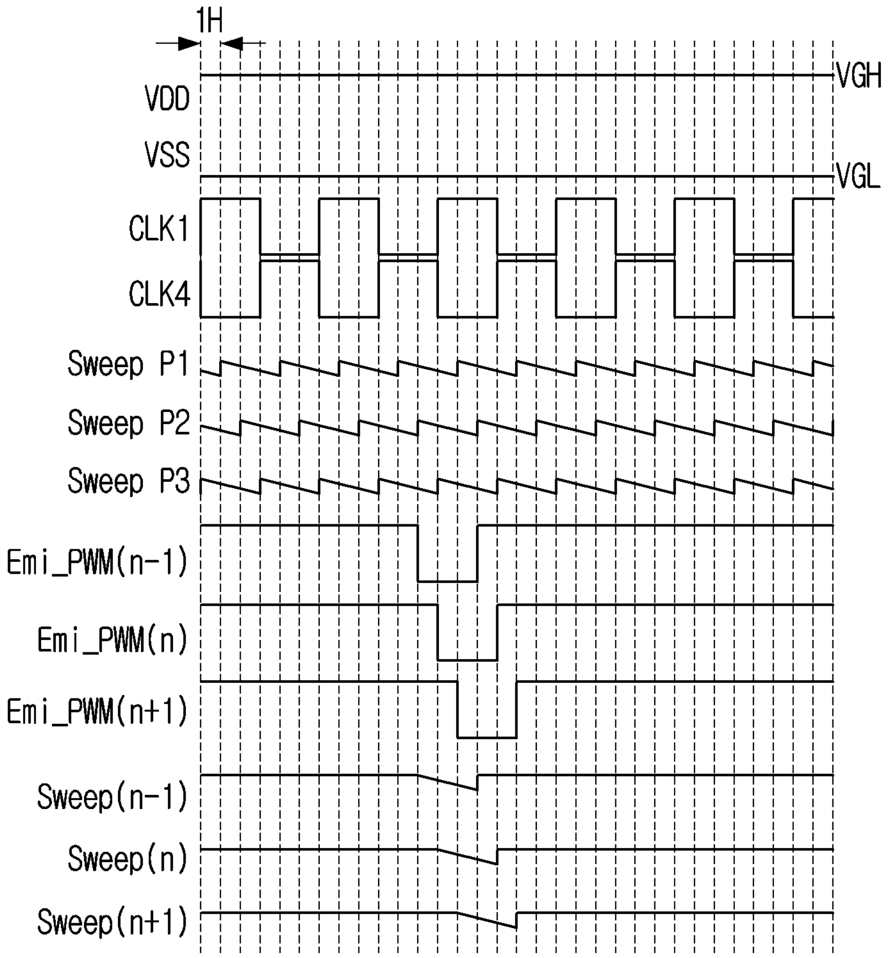
FIG. 11C is a timing diagram of various signals for driving a sweep/scan driver according to an embodiment.

FIGS. 11A to 11C are diagrams of generating a sweep signal using a scan driver.

FIG. 11A is a circuit diagram of a sweep/scan driver 800 according to an embodiment. As shown in FIG. 11A, the sweep/scan driver 800 may generate an emission signal Emi_PWM(n) and an emission signal sweep(n) (i.e., a sweep signal).

The sweep/scan driver 800 includes the scan driver 81 and the sweep driver 82. The scan driver 81 and the sweep driver 82 may form one circuit as shown in FIG. 11A.

The scan driver 81 may have the same circuit configuration as the scan driver 81 of FIG. 10A and may output the output signal Emi_PWM(n) through the first output end 5.

The sweep driver 82 may include serially-connected two transistors T9 and T10 and one capacitor C3, and may output an emission signal Sweep(n) at a second output end 6 which is a node in which the serially-connected two transistors T9 and T10 are connected to each other.

The gate terminal of the transistor T9 may be connected to the first output end 5 of the scan driver 81, the source terminal of the transistor T9 may receive an input sweep signal Sweep PN of the form in which the sweep signal sweeping between two different voltages is continuously repeated, and the drain terminal of the transistor T9 is connected to the transistor T10. The input sweep signal (Sweep PN) is one of a plurality of input sweep signals (SweepP1, SweepP2, and SweepP3) having different phases shown in FIGS. 11B and 11C.

FIG. 11B illustrates a connection relationship between sweep/scan drivers according to an embodiment. The connection relationship between the sweep/scan drivers shown in FIG. 11B is similar to the connection relationship of the scan drivers shown in FIG. 10B. But, the sweep/scan drivers of FIG. 11B additionally receive an input sweep signal (SweepP1 to SweepP3) to output an emission signal Sweep (n).

Referring to FIG. 11B, the output signal Emi_PWM(1) of the sweep/scan driver 800-1 for the first row line may be input to a sweep/scan driver (not shown) as the start signal of the sweep/scan driver (not shown) for the second row line, which is the next row line, and this is the same up to the sweep/scan driver **800-*n*** for the n-th row line.

The first dummy sweep/scan driver 800'-1 may receive the clock signals CLK1 and CLK4 having the opposite phases and the start signal Vst3 to output an Emi_PWM(-3)

signal. The output Emi_PWM(-3) signal is input to the sweep/scan driver 800-1 as a start signal of the sweep/scan driver 800-1 for the first row line.

The second dummy sweep/scan driver 800'-2 may receive clock signals CLK2 and CLK5 having opposite phases from each other, and a start signal Vst2, and output an Emi_PWM (-2) signal. The output Emi_PWM(-2) signal is input to a sweep/scan driver (not shown) as a start signal of the sweep/scan driver (not shown) for the second row line.

The third dummy sweep/scan driver 800'-3 may receive the clock signals CLK3 and CLK6 having a phase opposite to each other and the start signal Vst1 is input to output an Emi_PWM(-1) signal. The output Emi_PWM(-1) signal is input to a sweep/scan driver (not shown) as a start signal of the sweep/scan driver (not shown) for the third row line.

To the sweep/scan drivers 800-1 to **800-*n* for each row line, the same clock signals as clock signals applied to the row lines ahead by three row lines may be applied. Accordingly, to the sweep/scan driver 800-1 for the first row line, the clock signals CLK1 and CLK4 same as the clock signals applied to the first dummy sweep/scan driver 800'-1** may be applied. Although not shown in the figures, clock signals are applied in the same way to the remaining sweep/scan drivers.

To the sweep/scan drivers 800-1 to **800-*n* for each row line, three input sweep signals (SweepP1, SweepP2, and SweepP3**) having different phases may be alternately applied according to a row line.

According to FIG. 11B, the input sweep signal SweepP1 is applied to the sweep/scan driver 800-1 for the first row line, the input sweep signal sweepP2 and the input sweep signal sweepP3 are respectively applied to the sweep/scan drivers (not shown) for the second and third row lines, and the input sweep signal sweepp1 is applied again to the sweep/scan driver (not shown) for the fourth row line. Although not shown in the figures, an input sweep signal is applied in such a manner to the remaining sweep/scan drivers.

The sweep/scan drivers 800-1 to **800-*n*** for each row line may output the emission signal Emi_PWM(n) and the emission signal sweep(n) for the corresponding line.

FIG. 11C is a timing diagram of various signals for driving a sweep/scan driver according to an embodiment.

As shown in FIG. 11C, the clock signals CLK1 and CLK4 have opposite phases. Although not shown, the clock signals CLK2 and CLK5 may have opposite phases from each other, and clock signals CLK3 and CLK6 may have opposite phases from each other, as described above.

Three input sweep signals (SweepP1, SweepP2, SweepP3) may have different phases as illustrated in FIG. 11C.

Each input sweep signal may have a format in which an emission signal sweep(n) (That is a sweep signal) output from a sweep/scan driver to which the corresponding input sweep signal is applied is successively repeated.

For example, the input sweep signal SweepP3 input to the sweep/scan driver **800-*n* for the n-th row line may have a format that the emission signal Sweep(n) output by the sweep/scan driver 800-*n* is continuously repeated, and the input sweep signal SweepP2** input to the sweep/scan driver (not shown) for the n−1-th row line may have a format that the emission signal Sweep(n−1) output by the sweep/scan driver (not shown) for the n−1-th row line is continuously repeated.

This is because the emission signal sweep(n) is a signal selectively output from the input sweep signal.

Referring to FIGS. 11A and 11B, the scan driver 81 of the sweep/scan driver **800-*n* may receive the emission signal Emi_PWM(n−3) output from the sweep/scan driver (not shown) for the row line ahead of the three row lines and the clock signals CLK3 and CRK6 and may output the emission signal Emi_PWM(n) through the first output end 5**.

the sweep driver 82 includes a transistor T9, the gate terminal of the transistor T9 is connected to the first output end 5, the sweep driver 82 receives the input sweep signal SweepP3 through the source terminal of the transistor T9, and the drain terminal of the transistor T9 becomes a second output end 6.

The sweep driver 82 may select the emission signal Sweep(n) from the input sweep signal SweepP3 while the emission signal Emi_PWM(n) is output from the scan driver 81, and output the same through the second output end 6.

A more specific operation of the sweep/scan driver 800 may be readily understood by those of ordinary skill in the art through the connection relationship of the sweep/scan drivers 800'-1 to 800'-3, 800-1 to **800-*n* shown in FIG. 11B and the timing diagram shown in FIG. 11**C. A further description will be omitted.

It has been illustrated that the sweep/scan driver 800 generates an emission signal Emi_PWM(n) and Sweep(n), but by applying the same circuit and the same driving method described above through FIGS. 11A to 11C, the emission signal Emi_PAM(n) and Sweep(n) may be generated.

Figure 12A:
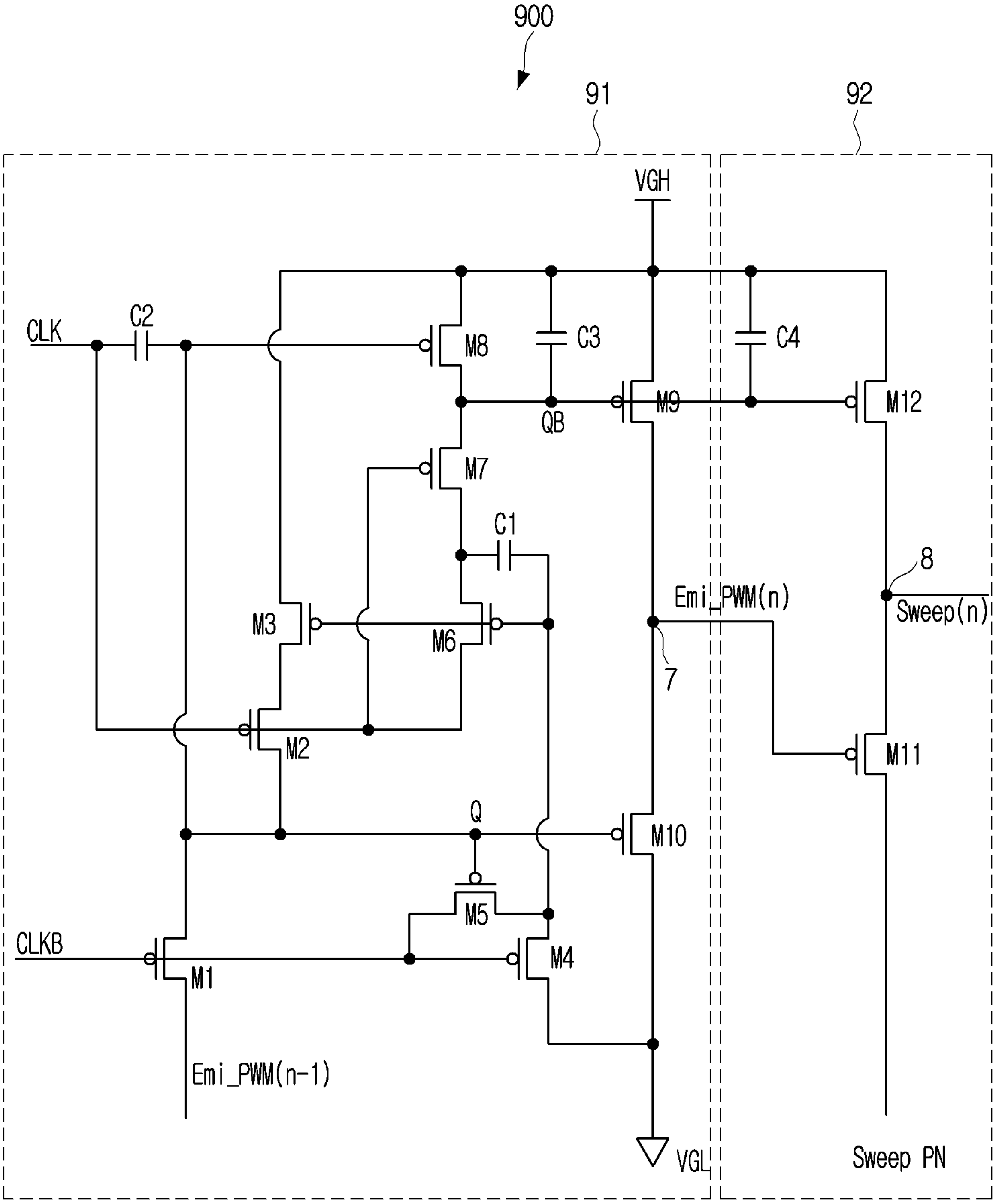
FIG. 12A is a circuit diagram of a sweep/emission driver according to an embodiment.
Figure 12B:
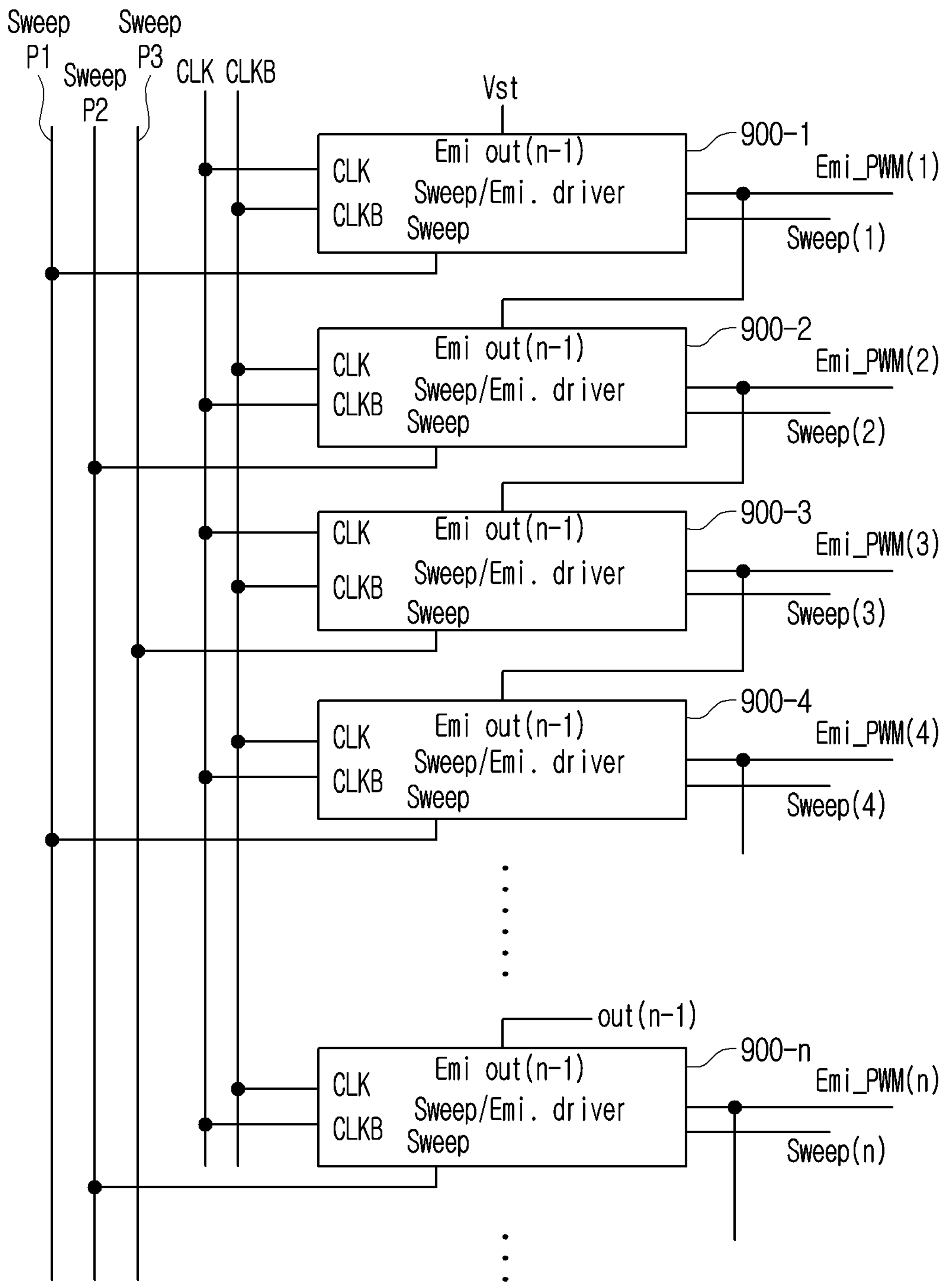
FIG. 12B illustrates a connection relationship between sweep/emission drivers according to an embodiment.
Figure 12C:
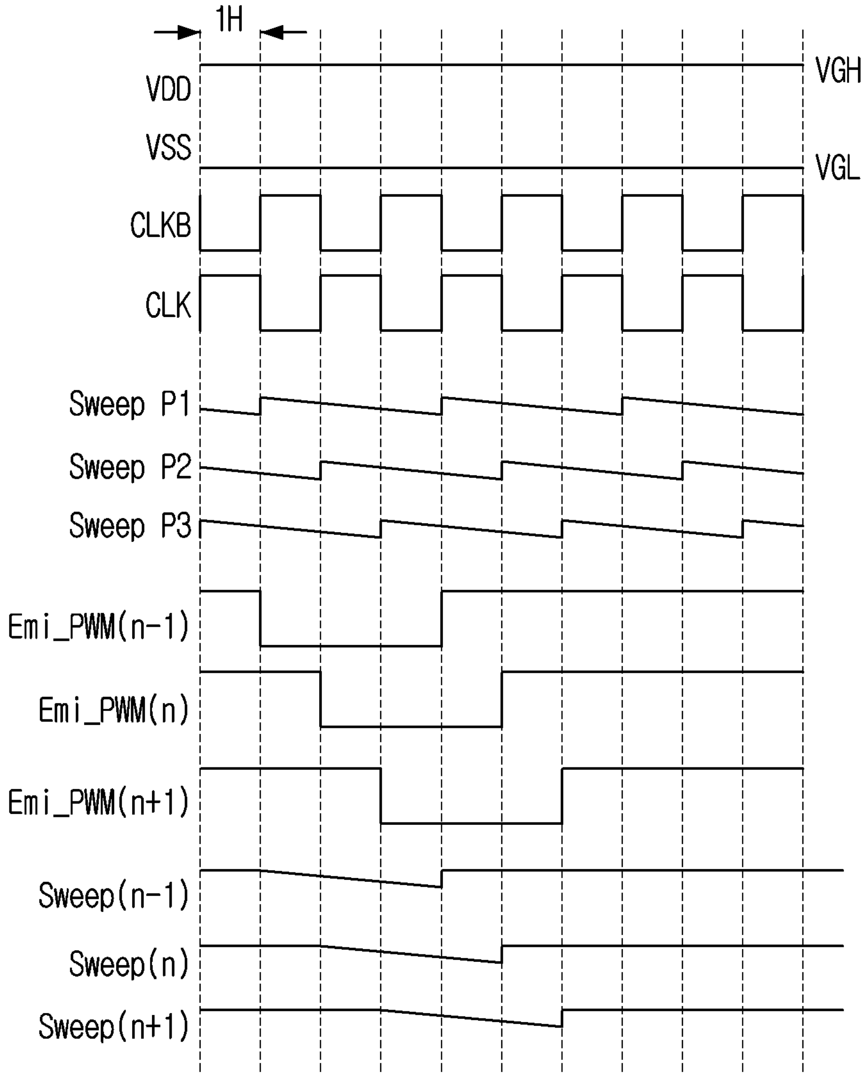
FIG. 12C is a timing diagram of various signals for driving a sweep/emission driver according to an embodiment.

FIGS. 12A to 12C are diagrams of an embodiment to generate a sweep signal using an emission driver.

FIG. 12A is a circuit diagram of a sweep/emission driver 900 according to another embodiment. As shown in FIG. 12A, the sweep/emission driver 900 may generate an emission signal Emi_PWM(n), and the sweep/emission driver 900 may generate an emission signal Sweep(n) (that is, a sweep signal).

The sweep/emission driver 900 may include an emission driver 91 and a sweep driver 92. The emission driver 91 and the sweep driver 92 may configure one circuit as shown in FIG. 12A.

The emission driver 91 has the same circuit configuration as the emission driver shown 91 in FIG. 9A, and may output an output signal Emi_PWM(n) through a first output end 7.

The sweep driver 92 may include two serially-connected transistors M11 and M12, and one capacitor C4, and may output an emission signal Sweep(n) at a second output end 8 which is a node in which the serially connected two transistors M11 and M12 are connected to each other.

The gate terminal of the transistor M11 may be connected to the first output end 7 of the emission driver 91, the source terminal of the transistor M11 may receive a sweep signal Sweep PN in which a sweep signal sweeping between two different voltages is continuously repeated is input, the drain terminal of the transistor M11 is connected to the transistor M12. The input sweep signal (Sweep PN) is one of a plurality of input sweep signals (SweepP1, SweepP2, SweepP3) having different phases, as shown in FIG. 12B and FIG. 12C.

FIG. 12B illustrates a connection relation between the sweep/emission drivers according to an embodiment. The connection relationship of the sweep/emission drivers shown in FIG. 12B is similar to the connection relationship of the emission drivers shown in FIG. 9B. However, the sweep/emission drivers of FIG. 12B may additionally output the emission signal Sweep(n) by receiving input sweep signal (SweepP1 to SweepP3).

Referring to FIG. 12B, the output signal Emi_PWM(1) of a sweep/emission driver 900-1 for the first row line may be input to a sweep/emission driver 900-2 as the start signal of a sweep/emission driver 900-2 for the second row line, and this is the same up to the sweep/emission driver **900-*n* for the n-th row line. The sweep/emission driver 900-1** for the first row line may receive a separate start signal Vst.

Referring to FIG. 12B, to the sweep/emission drivers 900-1 to **900-*n* for each row line, the clock signals CLK and CLKB are input to the opposite direction from the previous row line for each row line. For example, the CLK signal may be input to the CLK input end of the sweep/emission driver 900-1, and CLKB signal may be input to the CLKB input end of the sweep/emission driver 900-1. However, the CLKB signal may be input to the CLK input end of the sweep/emission driver 900-2 for the next row line, and the CLK signal may be input to the CLKB input end of the sweep/emission driver 900-2. This is the same up to the sweep/emission driver 900-*n*** for the n-th row line.

Three input sweep signals (SweepP1, SweepP2, and SweepP3) having different phases may be alternately applied to sweep/emission drivers 900-1 to **900-*n*** for each row line, along the row lines sequentially.

Referring to FIG. 12B, an input sweep signal SweepP1 is applied to the sweep/emission driver 900-1 for the first row line, the input sweep signal SweepP2 and the input sweep signal SweepP3 are respectively applied to the sweep/emission drivers 900-2 and 900-3 for the second and third row lines, and the input sweep signal SweepP1 is again applied to the sweep/emission driver 900-4 for the fourth row line. Although not shown in the figures, an input sweep signal is applied in the same manner to the remaining sweep/emission drivers.

Accordingly, the sweep/emission drivers 900-1 to **900-*n*** for each row line may output an emission signal Emi_PWM (n) and emission signal Sweep(n) for the corresponding line.

FIG. 12C is a timing diagram of various signals for driving a sweep/emission driver according to an embodiment.

As illustrated in FIG. 12C, three input sweep signals (SweepP1, SweepP2, and SweepP3) may have different phases.

Each input sweep signal may have a form in which the emission signal sweep(n) (That is a sweep signal) output from the sweep/emission driver is continuously repeated.

For example, the input sweep signal SweepP2 input to the sweep/emission driver **900-*n* for n-th row line may have a form in which the emission signal sweep(n) output by the sweep/emission driver 900-*n* is consecutively repeated, and the input sweep signal SweepP1** input to the sweep/emission driver (not shown) for the n−1-th row line may have a form in that the emission signal Sweep(n−1) output by the sweep/emission driver (not shown) for the n−1-th row line is consecutively repeated.

This is because the emission signal Sweep(n) is a signal selectively output from the input sweep signal.

Referring to FIGS. 12A and 12B, the emission driver 91 of the sweep-/emission driver **900-*n* may receive the emission signal Emi_PWM(n−1) output from the sweep/emission driver (not shown) for the previous row line and the clock signals CLK and CLKB, and may output the emission signal Emi_PWM(n) through the first output end 7**.

The sweep driver 92 includes a transistor M11, the gate terminal of the transistor M11 is connected to the first output end 7, the sweep driver 92 receives the input sweep signal SweepP2 through the source terminal of the transistor M11, and the drain terminal of the transistor M11 becomes the second output end 8.

The sweep driver 92 may select an emission signal sweep(n) from the input sweep signal sweepP2 while the emission signal EMI_PWM(n) is output from the emission driver and output the output the signal through the second output end 8.

A more specific operation of the sweep/emission driver 900 may be readily understood by those skilled in the art through the circuit configuration of FIG. 12A and connection relationship between the sweep/emission drivers 900-1 to **900-*n* shown in FIG. 12B, and the timing diagram shown in FIG. 12**C and a further description will be omitted.

It has been described that the sweep/emission driver 900 generates an emission signal_Emi_PWM(n) and sweep(n), but the emission signal Emi_PAM(n) and the Sweep(n) may be generated by applying the same circuit and driving method as described in FIGS. 12A to 12C.

By combining various circuits of FIGS. 8A to 12C, the gate driver 200-1 or 200-2 . . . may be implemented.

Various embodiments of the driving method of the display panel 100 as shown in FIGS. 3B and 3B will be described with reference to FIGS. 13 to 16B.

Figure 13:
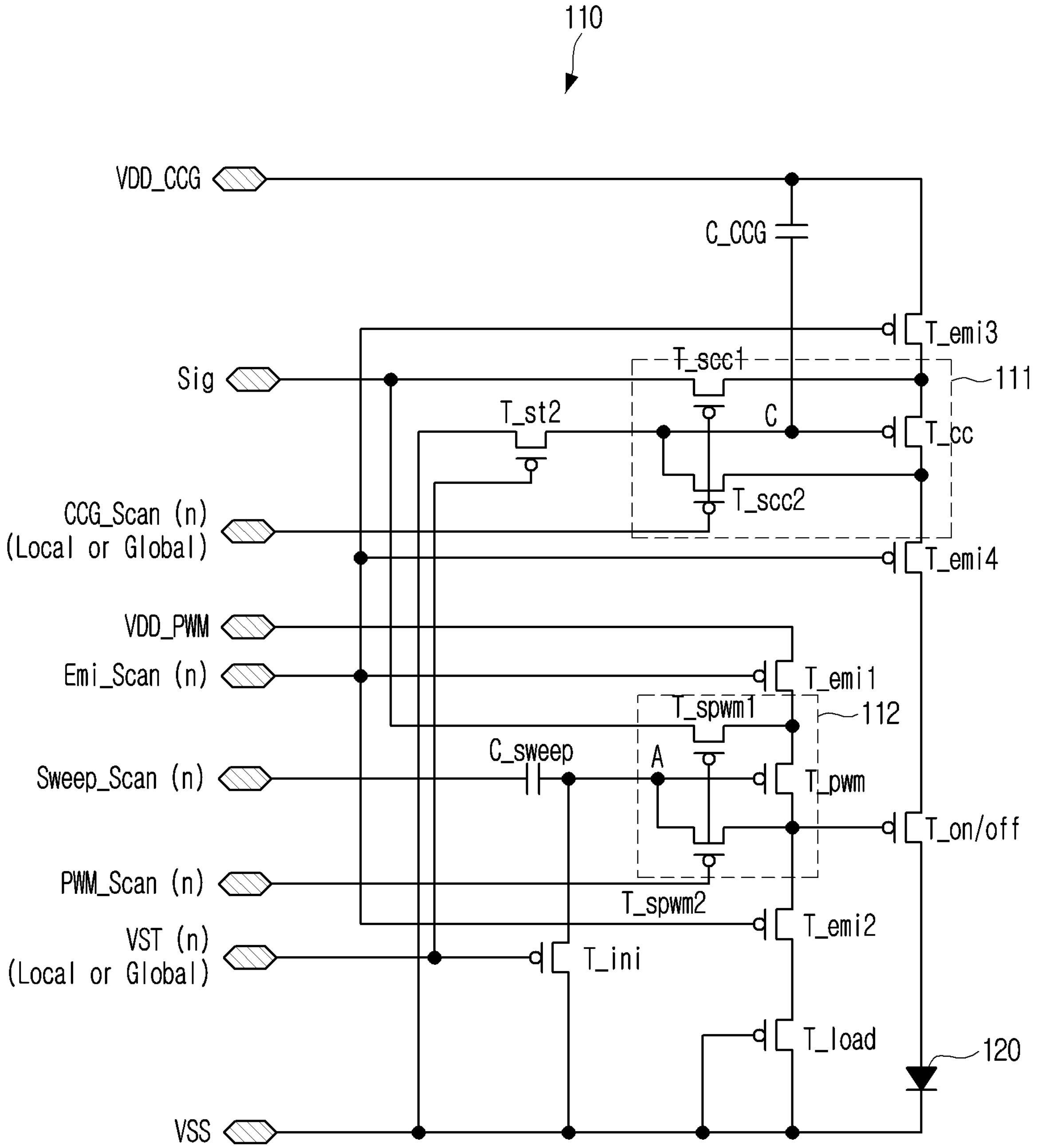
FIG. 13 is a detailed circuit diagram of a sub-pixel circuit according to an embodiment.

FIG. 13 is a detailed circuit diagram of a sub-pixel circuit according to another embodiment. The sub-pixel circuit 110 shown in FIG. 13 may configure a sub-pixel of the display panel 100 which is driven in a driving manner as described in FIG. 3B or 3C.

Figure 14A:
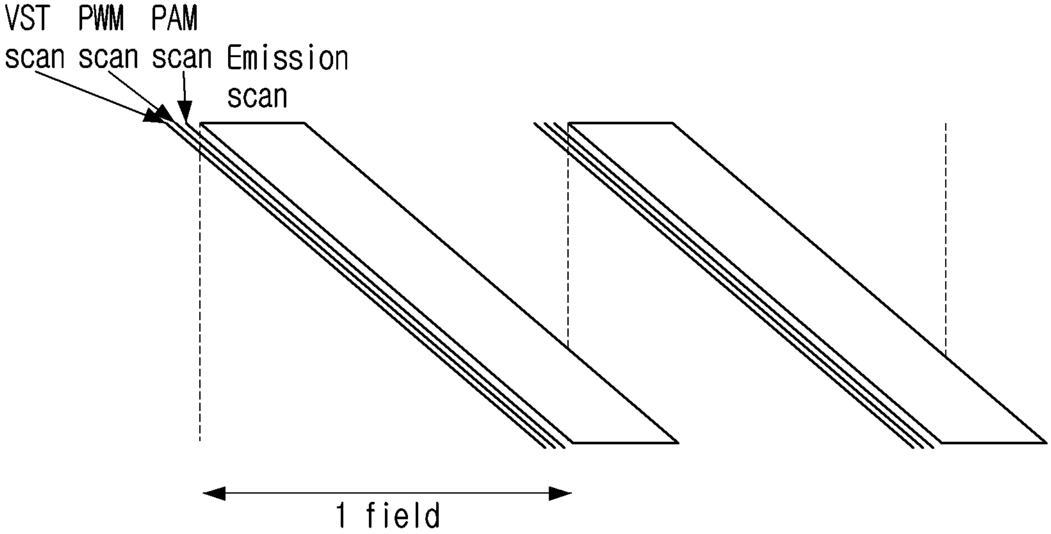
FIG. 14A illustrates a concept in which a display panel is driven during two image frame periods in the same manner as in FIG. 3B.
Figure 14B:
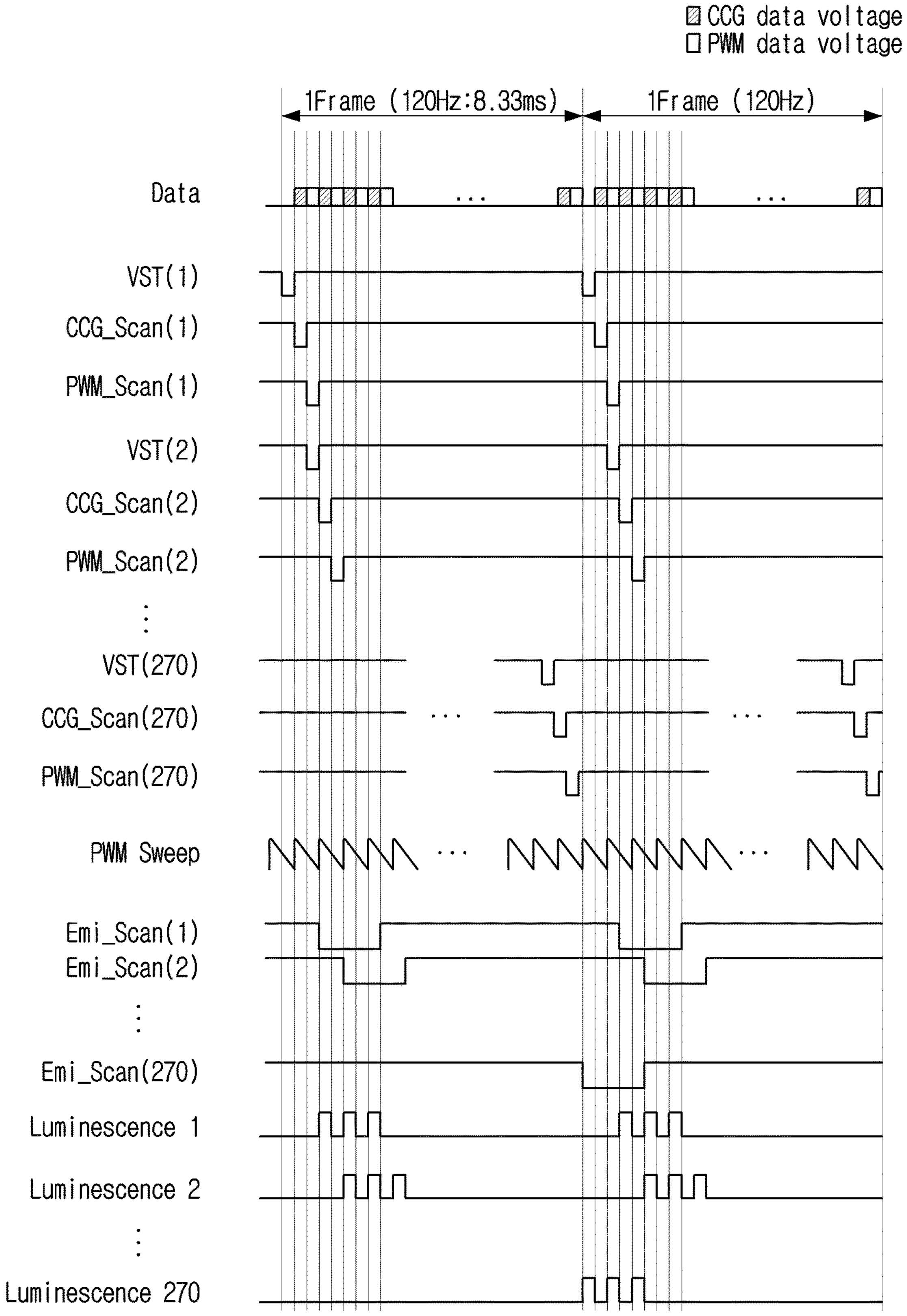
FIG. 14B is a timing diagram of various control signals for driving the sub-pixel circuit shown in FIG. 13 in the same manner as in FIG. 14A.
Figure 15A:
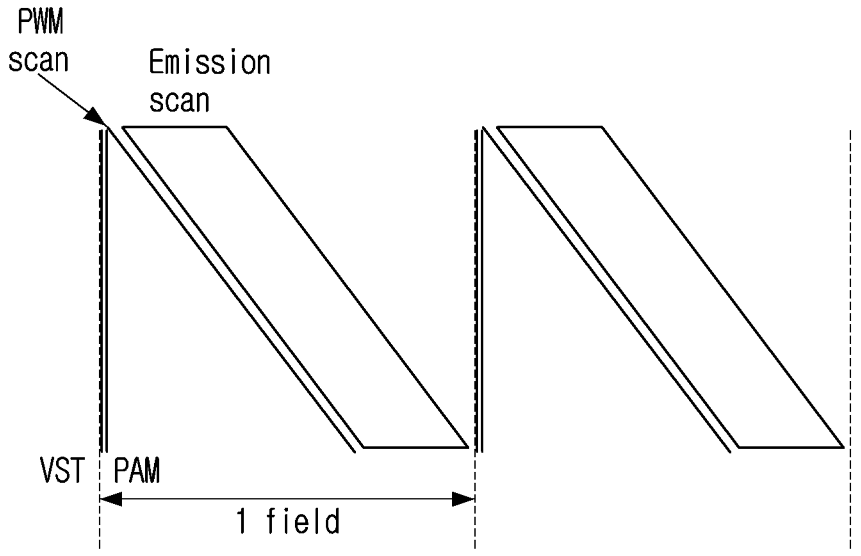
FIG. 15A illustrates a concept in which a display panel is driven during two image frame periods in the same manner as in FIG. 3C.
Figure 15B:
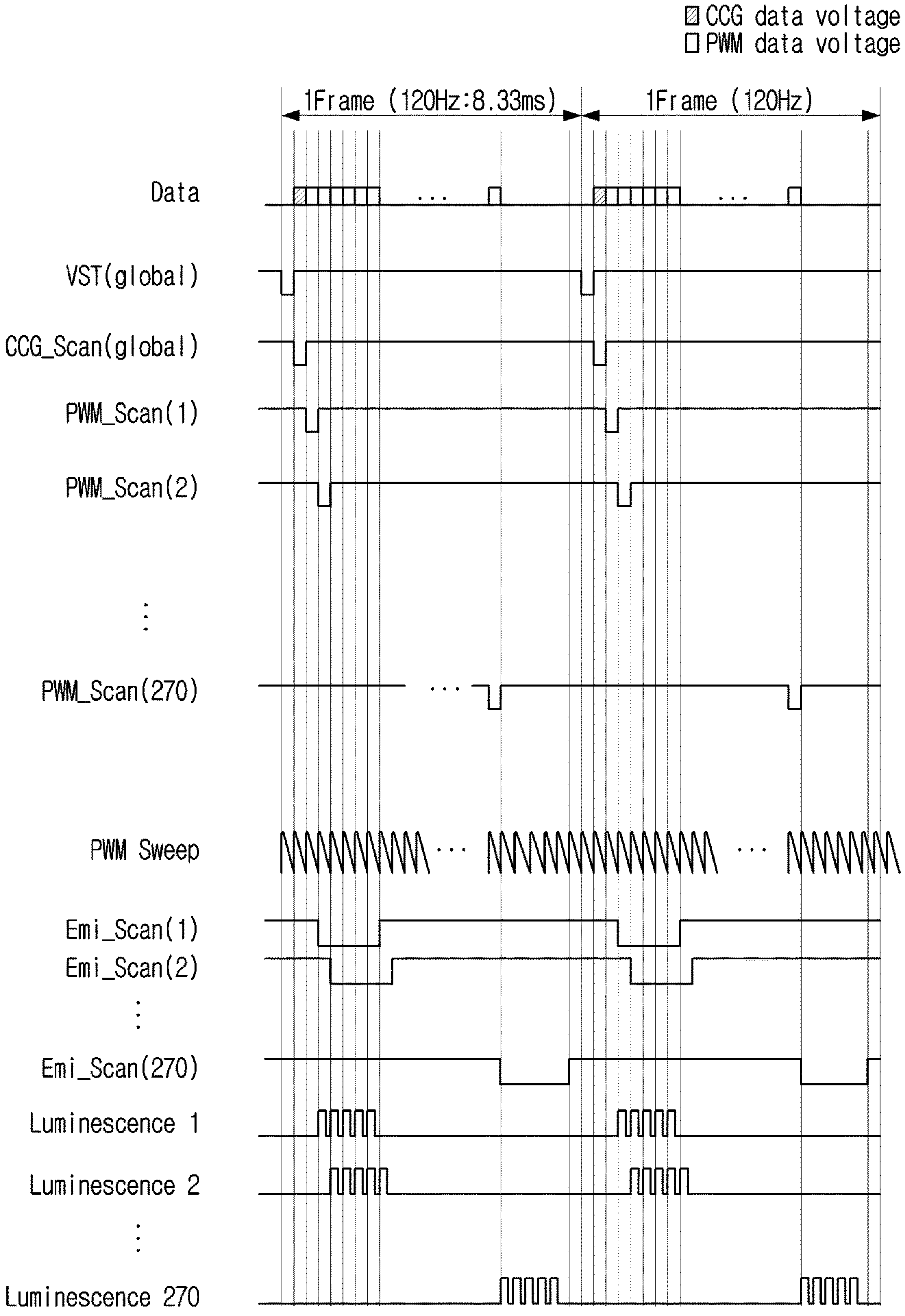
FIG. 15B is a timing diagram of various control signals for driving the sub-pixel circuit shown in FIG. 13 in a manner as shown in FIG. 15A.

“Local” shown in FIG. 13 shows a case where the display panel 100 is driven as shown in FIGS. 14A and 14B which will be described below, that is, “Local” shown in FIG. 13 shows a case where the corresponding signal is applied to the sub-pixel circuit 110 in a row line sequence. Meanwhile, “Global” shown in FIG. 13 shows a case where the display panel 100 is driven as shown in FIGS. 15A and 15B which will be described below, that is, “Global” shown in FIG. 13 shows a case where the corresponding signal is applied to all sub-pixel circuits 110 included in the display panel 100.

FIG. 14A illustrates that the display panel 100 is driven during two image frame periods in the same manner as in FIG. 3B. In each frame of FIG. 14A, the vertical axis represents a row line and the horizontal axis represents time.

Referring to FIG. 14A, VST scan represents driving of a control signal for an initialization operation of the sub-pixel circuit 110, PWM scan represents driving of a control signal for setting PWM data voltage, PAM scan refers to driving of a control signal for setting a constant current generator voltage, Emission scan refers to driving of a control signal for controlling a light emission operation of the inorganic light emitting element 120 based on the set PWM data voltage and the constant current generator voltage.

Referring to FIG. 14A, “scan” represented in each control signal may refer that the control signal is sequentially applied in the row line sequence.

Referring to FIG. 14A, the driver 200 may apply the data voltage (PWM data voltage and the constant current generator voltage) to the sub-pixels included in each row line of the display panel 100 in a row line sequence, and may drive the display panel 100 so that the sub-pixels included in each row line of the display panel 100 emit light in a row line sequence based on the applied data voltage.

The driver 200 may drive the display panel 100 so that the data voltage setting operation for the entire row line is performed during the entire time of the image frame time period. In this example, since the light emitting operation of the inorganic light emitting element 120 may be performed after the data voltage is set, the light emitting operation of some row lines may be performed in the next image frame period, as shown in FIG. 14A.

FIG. 14B is a timing diagram of various control signals for driving the sub-pixel circuit 110 shown in FIG. 13 in the same manner as in FIG. 14A.

According to an embodiment, the driver 200 may drive the sub-pixel circuit 110 illustrated in FIG. 13 as illustrated in FIG. 14A by driving the sub-pixel circuit 110 included in each row line as shown in FIG. 14B.

Figure 16A:
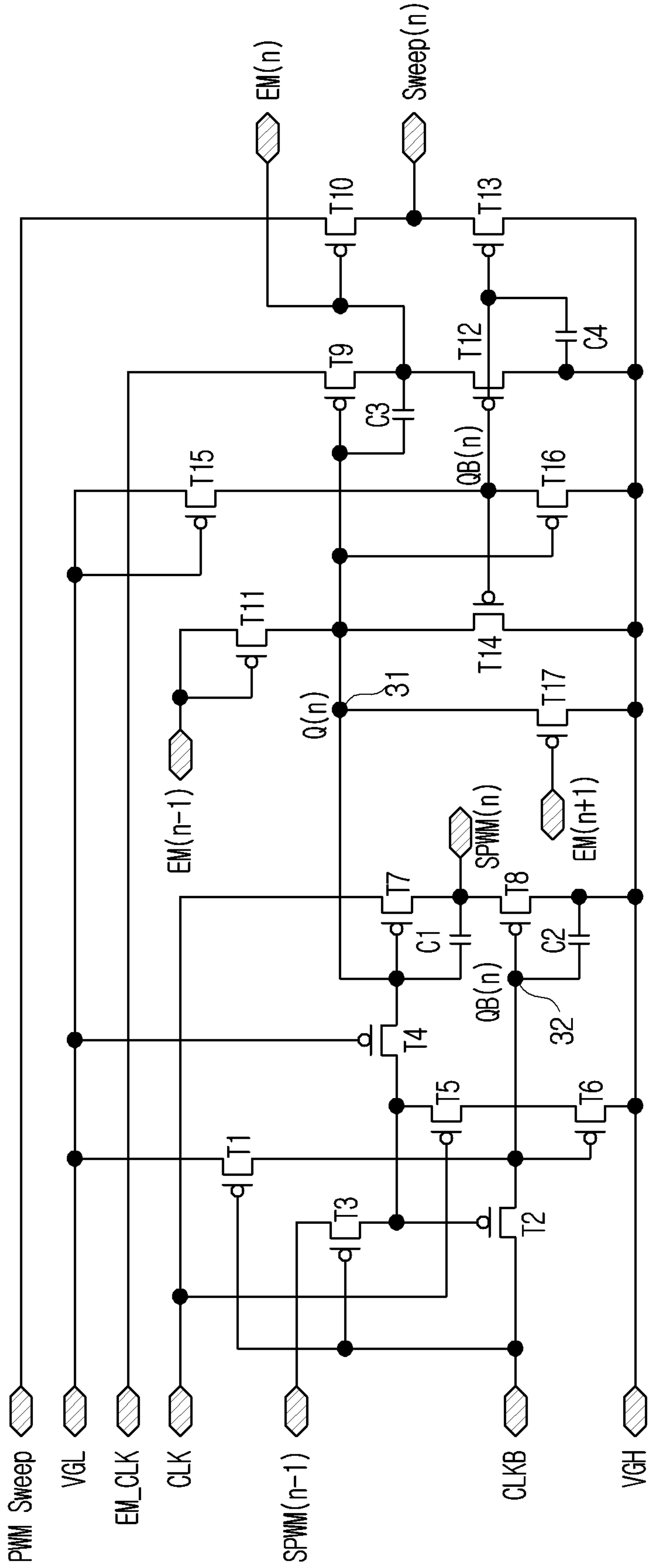
FIG. 16A is a circuit diagram of a gate driver according to an embodiment.

Referring to FIG. 14B, the PWM sweep signal represents an input sweep signal input to the gate driver to be described in FIG. 16A and does not represent a Sweep_Scan(n) signal input to the sub-pixel circuit 110 shown in FIG. 13. The Sweep_Scan(n) signal will be described below with reference to FIGS. 16A and 16B.

FIG. 15A illustrates that the display panel 100 is driven during two image frame periods in the same manner as in FIG. 3C. In each frame of FIG. 15A, the vertical axis represents a row line and the horizontal axis represents time.

Referring to FIG. 15A, unlike the driving method shown in FIG. 14A, the control signal VST and control signal PAM are not sequentially applied to the display panel 100 in a row line sequence and simultaneously applied. Accordingly, the expression of “scan” is not described.

According to the driving method shown in FIG. 15A, an initialization operation and a constant current generator voltage setting operation are simultaneously performed at the entire sub-pixel circuits of the display panel 100.

The PWM data voltage setting operation and the light emitting operation may be sequentially performed in a row line sequence, similar to that shown in FIG. 14A. Referring to the example shown in FIG. 15A, the driver 200 may apply a PWM data voltage to the sub-pixels included in each row line of the display panel 100, and may drive the display panel 100 to cause the sub-pixels included in each row line of the display panel 100 to emit light in a row line sequence based on the applied data voltage.

The driver 200 may drive the display panel 100 so that the data voltage setting operation and the light emitting operation for the entire row line are completed within an image frame time. In this example, as shown in FIG. 15A, the light emitting operation of the entire row lines may be completed in the corresponding image frame time.

FIG. 15B is a timing diagram of various control signals for driving the sub-pixel circuit 110 shown in FIG. 13 in a manner as shown in FIG. 15A.

Referring to FIG. 15B, unlike FIG. 14B, the VST signal and the CCG_Scan signal are input globally. The driver 200 may drive the sub-pixel circuit 110 illustrated in FIG. 13 as illustrated in FIG. 15A by driving the sub-pixel circuits 110 included in each row line as shown in FIG. 15B.

The PWM sweep signal shown in FIG. 15B represents the sweep signal input to the gate driver to be described in FIG. 16A, and does not refer to the Sweep_Scan(n) signal input to the sub-pixel circuit 110 shown in FIG. 13.

FIG. 16A is a circuit diagram of a gate driver according to an embodiment.

According to an embodiment, as shown in FIG. 16A, a gate driver 1300 which outputs the scan signal SPWM(n), the emission signal EM(n), and the emission signal Sweep (n), among the gate signals, may be implemented using one Q(n) node 31 and two QB(n) nodes 32 and 33.

To output the scan signal SPWM(n) and the emission signal EM(n), respectively, clock signals CLK, CRKB and EM_CLK are applied to the gate driver 1300.

The scan signal SPWM(n) of FIG. 16A may correspond to any of the VST(n), CCG_Scan(n) or PWM_Scan(n) as described in FIG. 13. In addition, the emission signal EM(n) of FIG. 16A may correspond to the Emi_Scan(n) showed in FIG. 13, and the emission signal Sweep(n) of FIG. 16A may correspond to Sweep_Scan(n) as described in FIG. 13.

The gate driver 1300, as illustrated in FIG. 16A, includes the transistor T10, the node 35 outputting the emission signal EM(n) is connected to the gate terminal of the transistor T10 and the gate driver 1300 receives the input sweep signal PWM sweep through the source terminal of the transistor T10.

The gate driver 1300 may select the emission signal Sweep(n) from the input sweep signal PWM Sweep while the emission signal EM(n) is output and may output through the drain terminal of the transistor T10.

Figure 16B:
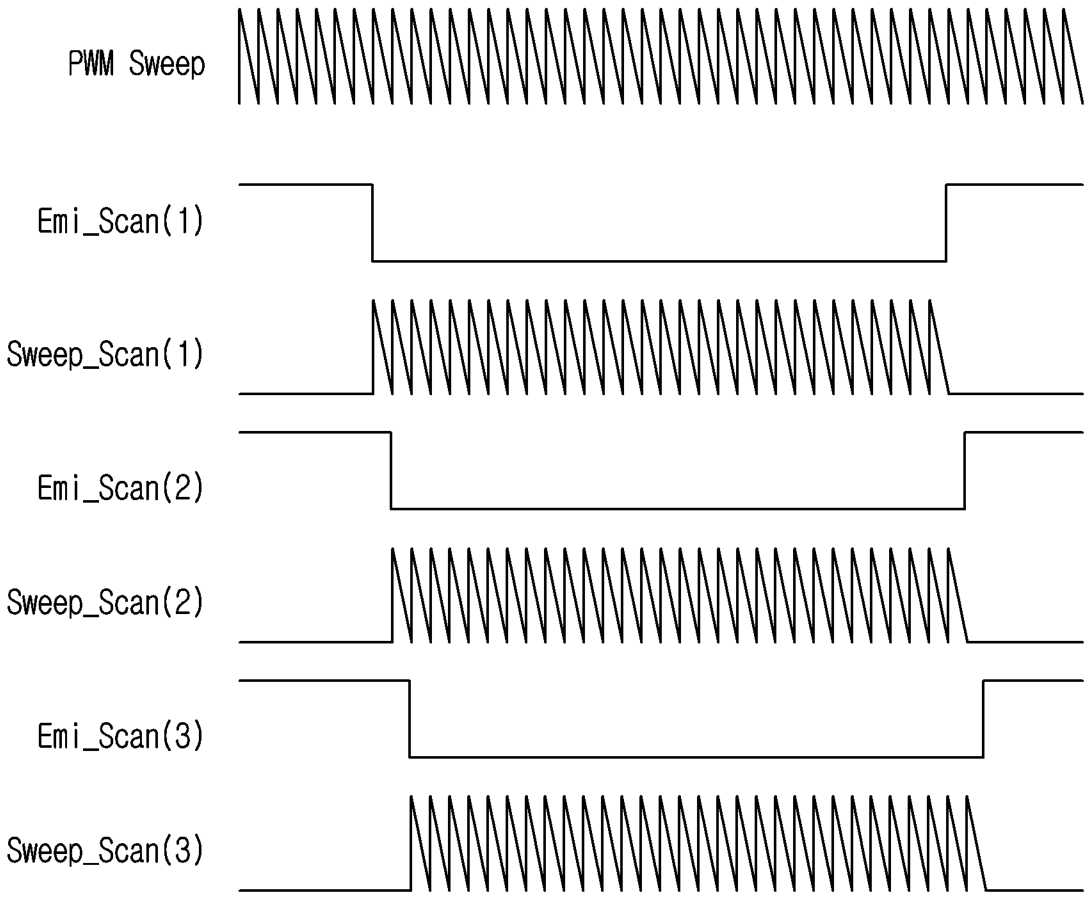
FIG. 16B is a timing diagram of an input sweep signal and emission signals.

FIG. 16B illustrates the timing relation among the input sweep signal PWM Sweep, emission signal Emi_Scan(n) and emission signal Sweep_Scan(n).

Referring to FIG. 16B, as described above, while the emission signal Emi_Scan(n) is being output, the emission signal Sweep_Scan(n) is selected from the input sweep signal PWM Sweep and output.

The Sweep_Scan (1) signal is selected and output from the input sweep signal PWM Sweep during the time when the Emi_Scan (1) signal is output, Sweep_Scan (2) signal is selected and output from the input sweep signal PWM Sweep during the time when Emi_Scan (2) is output, and Sweep_Scan (3) signal is selected and output from the input sweep signal PWM Sweep during the time when Emi_Scan (3) signal is output.

Referring to FIG. 16B, unlike the emission signal Sweep (n) described with reference to FIGS. 6A to 12C, the plurality of consecutive Sweep signals are included in the emission signal Sweep_Scan(n). The sweep signal refers to a unit sweep signal that sweeps once between two different voltages.

According to an embodiment, the gate driver 1300 may apply a plurality of consecutive sweep signals to sub-pixels included in one row line in one light emitting period for one row line.

Figure 17A:
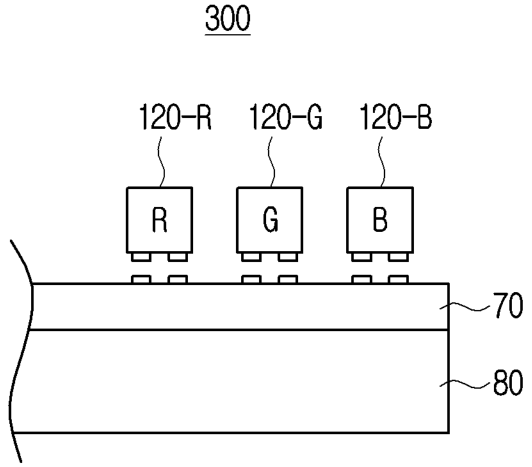
FIG. 17A is a cross-sectional view of a display module according to an embodiment.

FIG. 17A is a cross-sectional view of a display module according to an embodiment. Referring to FIG. 17A, one pixel included in a display module 300 is illustrated for convenience.

Referring to FIG. 17A, the display module 300 includes a glass substrate 80, a thin film transistor (TFT) layer 70, and inorganic light emitting elements R, G, B (120-R, 120-G, and 120-B). The sub-pixel circuit 110 described above may be embodied as a TFT, and may be included in the TFT layer 70 on the glass substrate 80.

Each of the inorganic light emitting elements R, G, B (120-R, 120-G, and 120-B) may be mounted on the TFT layer 70 to be electrically connected to the corresponding sub-pixel circuit 110 to configure the sub-pixel described above.

Although not illustrated, in the TFT layer 70, the sub-pixel circuit 110 that provides a driving current to the inorganic light emitting elements (120-R, 120-G, 120-B) exists for each of the inorganic light emitting elements (120-R, 120-G, 120-B), and each of the inorganic light emitting elements (120-R, 120-G, 120-B) may be mounted or placed on the TFT layer 70, respectively, so as to be electrically connected with the corresponding sub-pixel circuit 110.

Referring to FIG. 17A, the inorganic light emitting element R, G, B (120-R, 120-G, 120-B) is a micro LED in a flip chip type. An embodiment is not limited to thereto, and according to an embodiment, the inorganic light emitting elements R, G, B (120-R, 120-G, 120-B) may be a lateral type or a vertical type of micro LED.

Figure 17B:
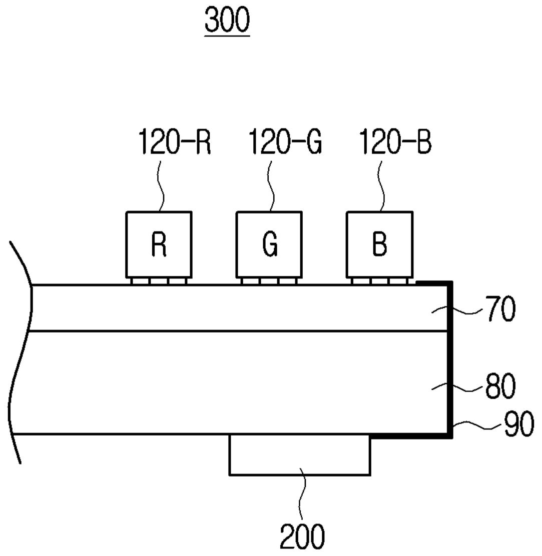
FIG. 17B is a cross-sectional view of a display module according to another embodiment of the present disclosure.

FIG. 17B is a cross-sectional view of a display module according to another embodiment of the present disclosure.

Referring to FIG. 17B, the display module 300 may include the TFT layer 70 formed on one surface of the glass substrate 80, the inorganic light emitting elements R, G, B (120-R, 120-G, 120-*b*) mounted on the TFT layer 70, the driver 200, and a connection wire 90 for electrically connecting the sub-pixel circuit 110 and the driver 200 formed on the TFT layer 70.

As described above in FIG. 4, according to an embodiment, at least some of the various circuits of the driver 200 may be implemented in a separate chip form to be arranged on a rear surface of the glass substrate 80 and may be connected to the sub-pixel circuits 110 formed on the TFT layer 70 through the connection wire 90.

Referring to FIG. 17B, the sub-pixel circuits 110 included in the TFT layer 70 may be electrically connected to the driver 200 through the connection wire 90 formed on an edge (or side) of the TFT panel (hereinafter, the TFT layer 70 and the glass substrate 80 in combination is called the TFT panel).

A reason of forming the connection wire 90 in the edge area of the display panel 100 to connect the sub-pixel circuits 110 and the driver 200 included in the TFT layer 70 is that, when connecting the sub-pixel circuits 110 and the driver 200 by forming a hole penetrating the glass substrate 80, there may be a problem such as crack in the glass substrate 80 due to the temperature difference between the manufacturing process of the TFT panel 70, 80 and the process of filling the hole with a conductive.

Figure 17C:
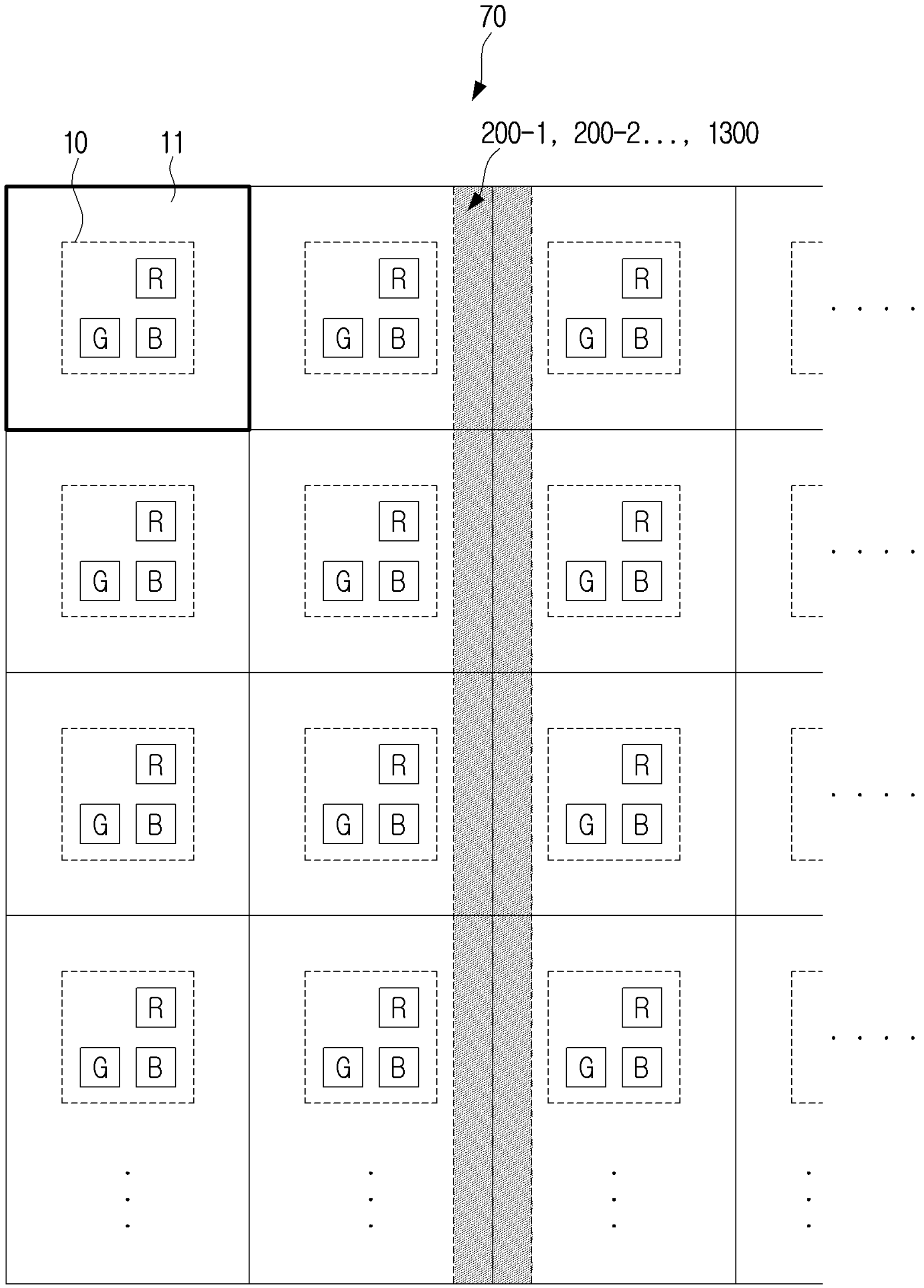
FIG. 17C is a plan view of a thin film transistor (TFT) layer according to an embodiment.

As described above in FIG. 4, according to another embodiment, at least some of the various circuits of the driver 200 may be formed in the TFT layer with sub-pixel circuits formed in the TFT layer in the display panel 100 and may be connected to the sub-pixel circuits. FIG. 17C illustrates this embodiment.

FIG. 17C is a plan view of the TFT layer 70 according to an embodiment. Referring to FIG. 17C, there is a remaining area 11 other than an area (in this area, sub-pixel circuits 110 corresponding to each of the R, G, B sub-pixels included in the pixel 10 are present) occupied by one pixel in the TFT layer 70.

In the TFT layer 70, remaining areas 11 are present and thus, some of the various circuits of the driver 200 described above may be formed on the remaining areas 11.

FIG. 17C illustrates an example in which the gate drivers 200-1, 200-2 . . . or 1300 are implemented in the remaining area 11 of the TFT layer 70. As such, a structure in which the gate drivers 200-1, 200-2 . . . or 1300 are formed inside the TFT layer 70 may be called a gate in panel (GIP) structure, but a name is not limited thereto.

FIG. 17C is merely one example, and a circuit which may be included in the remaining area 11 of the TFT layer 70 is not limited to the gate drivers 200-1, 200-2 . . . 1300. According to an embodiment, the TFT layer 70 may further include a multiplexer (MUX) circuit for selecting R, G, and B sub-pixels, and an electro static discharge (ESD) protection circuit for protecting the sub-pixel circuit 110 from the static electricity, a sweep voltage providing circuit, or the like.

Figure 18:
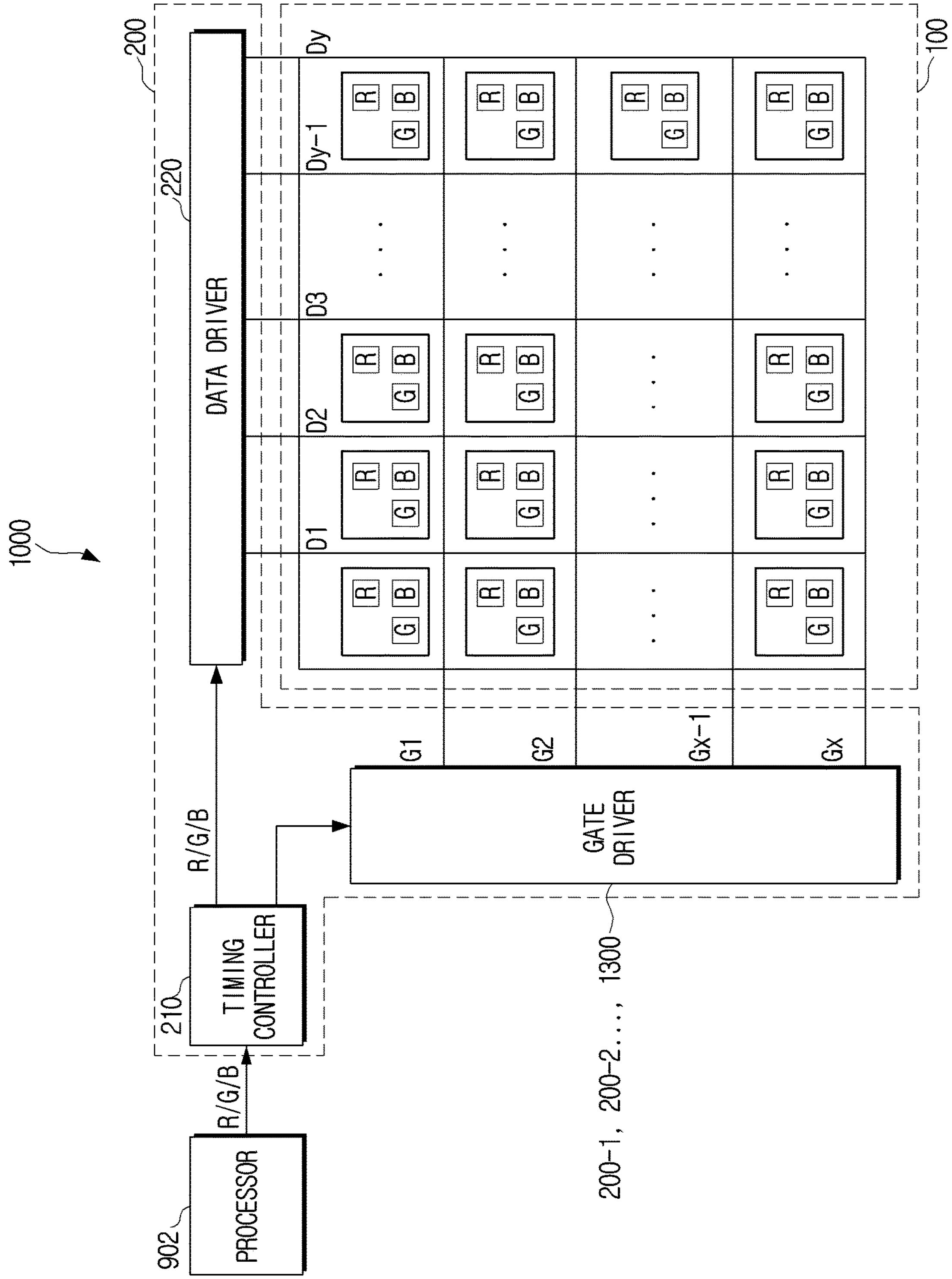
FIG. 18 is a configuration diagram of a display device according to an embodiment.

FIG. 18 is a configuration diagram of a display device 1000 according to an embodiment.

Referring to FIG. 18, a display device 1000 includes the display panel 100, the driver 200, and a processor 902.

The display panel 100 includes a plurality of pixels, each of which includes a plurality of sub-pixels.

The display panel 100 may be formed in a matrix shape so that the gate lines (G1 to Gx) and the data lines (D1 to Dy) intersect each other, and each pixel may be formed in a region provided by the intersection.

Each pixel may include three sub-pixels such as R, G, and B, and each sub-pixel included in the display panel 100 may include the inorganic light emitting element 120 and the sub-pixel circuit 110 of a corresponding color, as described above.

The data lines (D1 to Dy) are lines for applying a data voltage (especially, a PWM data voltage) to each sub-pixel included in the display panel 100, and the gate lines (G1 to Gx) are lines for selecting pixels (or sub-pixels) included in the display panel 100 by lines. The data voltage applied through the data lines (D1 to Dy) may be applied to the pixel (or sub-pixel) of the selected row line through the gate signal.

According to an embodiment, each data line (D1 to Dy) may be applied with the data voltage to be applied to the pixel associated with each data line. As a single pixel includes a plurality of sub-pixels (e.g., R, G, B sub-pixels), the data voltage (that is, R data voltage, G data voltage, and B data voltage) to be applied to each of the R, G, B sub-pixels included in a single pixel may be time-divided and applied to each sub-pixel through one data line. Data voltages that are time-divided and applied through a single data line as above may be applied to each sub-pixel through the MUX circuit.

According to an embodiment, a separate data line may be provided for each R, G, and B sub-pixels. In this example, the R data voltage, the G data voltage, and the B data voltage need not be time-divided and applied, and a corresponding data voltage may be applied to the corresponding sub-pixel simultaneously through each data line.

Referring to FIG. 18, for convenience of illustration, only one set of gate lines, such as G1 to Gx, are shown. However, the number of the actual gate lines may vary depending on the driving method of the sub-pixel circuit 110 included in the display panel 100.

The driver 200 may drive the display panel 100 according to the control of the processor 902, and may include a timing controller 210, a data driver 220, and the gate drivers 200-1, 200-2, . . . , 1300, or the like.

The timing controller 210 may receive from the outside an input signal (IS), horizontal synchronous signal (Hsync), vertical synchronous signal (Vsync), and main clock signal (MCLK), or the like, generate an image data signal, a scanning control signal, a data control signal, a light emitting control signal, or the like, and provide the same to the display panel 100, the data driver 220, the gate drivers 200-1, 200-2 . . . or 1300, or the like.

The timing controller 210 may be a control signal for selecting the R, G, B sub-pixels, respectively, that is, the MUX signal to the MUX circuit (not illustrated). A plurality of sub-pixels included in the pixels of the display panel 100 may be selected through the MUX circuit (not illustrated), respectively.

The data driver 220 (or source driver) is a means of generating a data signal (in particular, PWM data voltage), and may generate the data signal by being forwarded with the image data of the R/G/B component from the processor 902, etc. The data driver 220 may apply the generated data signal to each sub-pixel circuit 110 of the display panel 100 through the data lines (D1 to Dy).

The gate drivers 200-1, 200-2 . . . or 1300 may generate various gate signals (e.g., VST, SP, Emi_PWM, Emi_PAM, Sweep, SET, etc.) for selecting and driving a pixel arranged in matrix form in a row line unit, and may apply the generated gate signal to the display panel 100 through the gate lines (G1 to Gx). According to an embodiment, the gate drivers 200-1, 200-2 . . . or 1300 may apply the generated gate signals sequentially in a row line sequence.

Although not shown in the drawings, the driver 200 may further include driving voltage providing circuits to provide various driving voltages (for example, first driving voltage (VDD_PAM), second driving voltage (VDD_PWM), ground voltage (VSS), reset voltage (Vset), test voltage (TEST), constant current generator voltage (VPAM_R/G/B), or the like) to the sub-pixel circuit 110 included in the display panel 100, clock signals to provide clock signals to the gate drivers 200-1, 200-2, . . . or 1300 or the data driver 220, MUX circuit, sweep voltage providing circuit, EST protection circuit, or the like.

A processor 902 controls overall operations of a display device 1000. The processor 902 may drive the display panel 100 by controlling the driver 200.

The processor 902 may be implemented with at least one of a central processing unit (CPU), a micro-controller, an application processor (AP), a communication processor (CP), or an advanced reduced instruction set computing (RISC) machine (ARM) processor.

Referring to FIG. 18, the processor 902 and the timing controller 210 are described as separate components. However, according to an embodiment, only one of the components is included in the display device 1000, and an embodiment in which the included component performs the remaining component function is possible.

According to various embodiments, it may be prevented that wavelength of light emitted by an inorganic light emitting element changes according to a gray scale.

A stain or a color that may appear on an image displayed on the display panel due to the deviation between the sub-pixel circuits may be easily corrected. Even when a large-sized display panel is formed by combining display panels in a form of a module, the brightness or color difference between each display panel module may be corrected.

A more optimized driving circuit may be designed, and an inorganic light emitting element may be driven stably and efficiently. In particular, power consumption in a display panel may be reduced. Also, the display panel may be miniaturized and light-weighted.

For example, the sub-pixel circuit 110 is implemented as a P-type TFT, but an embodiment above may be applied to the N-type TFT as well.

According to various embodiments, the TFT forming the TFT layer (or the TFT panel) is not limited to a specific structure or type. In other words, the TFT recited in various examples may be implemented as a low temperature poly silicon (LTPS) TFT, an oxide TFT, a poly silicon or a-silicon TFT, an organic TFT, and a graphene TFT, or the like, and may be applied to a P type (or N-type) MOSFET in a Si wafer CMOS process.

It has been described that the sub-pixel circuit 110 is implemented in the TFT layer 70, but an embodiment is not limited thereto. According to another embodiment, when implementing the sub-pixel circuit 110, it is possible to implement a pixel circuit chip in the form of an ultra-small micro-chip and mount the chip on the substrate 80 in a sub-pixel unit or pixel unit. A position in which the sub-pixel chip is placed may be, for example, around the corresponding inorganic light emitting element 120, but is not limited thereto.

According to still another embodiment, the driving circuits for driving the micro-LED (e.g., various circuits of the sub-pixel circuit 110 and the driver 200 described above) may be arranged in the pixel region and may be implemented by a micro-IC for controlling at least 2 n pixel driving. In this example, in the TFT layer [or backplane], only a channel layer connecting the micro-IC and each micro-LED may be formed, instead of the TFT device.

The above description is merely illustrative of the technical idea of the disclosure. It will be apparent to those of ordinary skill in the art that various modifications and variations can be made without departing from the essential characteristics of the disclosure. In addition, embodiments according to the disclosure are not intended to limit the technical spirit of the disclosure and are not intended to limit the scope of the disclosure to those skilled in the art. Accordingly, the scope of the disclosure should be construed by the following claims, and all technical concepts within the scope of the disclosure should be construed as being included within the scope of the disclosure.

What is claimed is:

1. A display module comprising:

a display panel in which a plurality of pixels are disposed on a plurality of row lines, each of the pixels including a plurality of sub-pixels, and each of the plurality of sub-pixels comprising an inorganic light emitting diode and a sub-pixel circuit configured to drive the inorganic light emitting diode based on a plurality of first control signals, a plurality of second control signals and a sweep signal sweeping between two different voltages; and a driver configured to:

set a pulse width modulation (PWM) data voltage for an image frame to sub-pixel circuits of the display panel in a row line sequence by applying the plurality of first control signals to to the sub-pixel circuits of the display panel in the row line sequence, and drive the display panel such that inorganic light emitting diodes of the display panel emit light multiple times based on the PWM data voltage in the row line sequence, by applying the plurality of second control signals and the sweep signal to the sub-pixel circuits of the display panel multiple times in the row line sequence, wherein the driver comprises:

a first driver circuit comprising a first plurality of transistors and configured to generate at least one of the plurality of first control signals; and a second driver circuit comprising a second plurality of transistors and configured to generate the sweep signal and at least one second control signal of the plurality of second control signals, and wherein the first driver circuit and the second driver circuit are provided for each of the plurality of row lines, wherein the second driver circuit comprises:

a first circuit comprising two first series-connected transistors among the second plurality of transistors, and configured to generate the at least one second control signal; and a second circuit electrically connected to the first circuit, and configured to generate the sweep signal based on the at least one second control signal generated in the first circuit, wherein the first circuit further comprises a first output end to which the two first series-connected transistors are connected and which is configured to output the at least one second control signal to the sub-pixels included in the one row line, and wherein the second circuit comprises a second transistor in which a gate terminal is connected to the first output end, among the second plurality of transistors.

2. The display module of claim 1, wherein the driver is further configured to:

during a data setting period for one row line among the plurality of row lines, apply the plurality of first control signals to sub-pixel circuits included in the one row line and set the PWM data voltage to the sub-pixel circuits included in the one row line, and during each of a plurality of light emitting periods for the one row line, apply the plurality of second control signals and the sweep signal to the sub-pixel circuits included in the one row line so that inorganic light emitting diodes of the sub-pixels included in the one row line to emit light during a time corresponding to the PWM data voltage in each of the plurality of light emitting periods for the one row line.

3. The display module of claim 2, wherein a first light emitting period among the plurality of light emitting periods is temporally consecutive with the data setting period, and wherein each of the plurality of light emitting periods includes a preset time interval.

4. The display module of claim 2, wherein the sub-pixel circuit comprises:

a constant current generator circuit configured to provide constant current to the inorganic light emitting diode during the plurality of light emitting periods, and a PWM circuit to control an amount of time during which the constant current flows in the inorganic light emitting diode based on the PWM data voltage and the sweep signal.

5. The display module of claim 4, wherein the constant current generator circuit comprises a first driving transistor and is further configured to provide the constant current to the inorganic light emitting diode while the first driving transistor is turned on in the plurality of light emitting periods, and wherein the PWM circuit comprises a second driving transistor, and is further configured to:

set the PWM data voltage to a gate terminal of the second driving transistor according to the plurality of first control signals, and based on the second driving transistor being turned on by a change in a voltage of the gate terminal of the second driving transistor according to the sweep signal, turn off the first driving transistor.

6. The display module of claim 1, wherein the second transistor is configured to, based on the at least one second control signal input through the gate terminal, select and output the sweep signal to be applied to the sub-pixels included in the one row line from an input signal, and wherein the input signal comprises the sweep signal which is consecutively repeated.

7. The display module of claim 6, wherein each second driver circuit comprises a corresponding second circuit, and wherein input signals respectively input to corresponding second circuits of the second driver circuits corresponding to two consecutive row lines among the plurality of row lines are the same signals having phases different from each other.

* * * * *